(12) United States Patent
Goto et al.

(10) Patent No.: US 8,526,204 B2
(45) Date of Patent: Sep. 3, 2013

(54) POWER CONVERTER WITH ELECTRICAL SWITCHING ELEMENT

(75) Inventors: Shinya Goto, Gifu (JP); Kimikazu Nakamura, Handa (JP); Kanretsu Kin, Chiryu (JP); Tsuyoshi Yamashita, Anjo (JP)

(73) Assignee: Denso Corporation, Kariya (JP)

( * ) Notice: Subject to any disclaimer, the term of this patent is extended or adjusted under 35 U.S.C. 154(b) by 244 days.

(21) Appl. No.: 13/092,510

(22) Filed: Apr. 22, 2011

(65) Prior Publication Data

US 2011/0261589 A1 Oct. 27, 2011

(30) Foreign Application Priority Data

Apr. 22, 2010 (JP) ................................. 2010-098983

(51) Int. Cl.
*H02M 3/335* (2006.01)

(52) U.S. Cl.
USPC ...................................................... 363/21.18

(58) Field of Classification Search
USPC ....................... 363/15, 20, 21.1, 21.18, 26, 41
See application file for complete search history.

(56) References Cited

U.S. PATENT DOCUMENTS

| | | | | |
|---|---|---|---|---|
| 5,619,403 A | * | 4/1997 | Ishikawa et al. | 363/21.06 |
| 5,636,106 A | * | 6/1997 | Batarseh et al. | 363/16 |
| 6,392,364 B1 | * | 5/2002 | Yamamoto et al. | 315/291 |
| 7,132,818 B2 | * | 11/2006 | Matsuura | 323/222 |
| 7,482,794 B2 | * | 1/2009 | Hunt et al. | 323/284 |
| 7,965,151 B2 | * | 6/2011 | Liu et al. | 332/109 |
| 8,093,845 B2 | * | 1/2012 | Cheng | 318/400.01 |
| 8,164,316 B2 | * | 4/2012 | Kobori et al. | 323/282 |
| 8,310,319 B2 | * | 11/2012 | Liu et al. | 332/109 |
| 2005/0135132 A1 | | 6/2005 | Masuda | |
| 2006/0103612 A1 | * | 5/2006 | Ozaki | 345/83 |
| 2006/0227028 A1 | * | 10/2006 | Balogh et al. | 341/144 |
| 2007/0058404 A1 | | 3/2007 | Yaguchi | |
| 2008/0136355 A1 | * | 6/2008 | Han et al. | 315/307 |
| 2009/0212761 A1 | * | 8/2009 | Ohta et al. | 324/76.11 |
| 2009/0224742 A1 | * | 9/2009 | Ertl et al. | 323/283 |
| 2010/0241879 A1 | * | 9/2010 | Hara et al. | 713/300 |
| 2010/0264892 A1 | * | 10/2010 | Takahashi | 323/282 |

FOREIGN PATENT DOCUMENTS

| | | |
|---|---|---|
| JP | P2005-168235 A | 6/2005 |
| JP | P2005-237117 A | 9/2005 |
| JP | P2006-158025 A | 6/2006 |
| JP | 2009-131067 | 6/2009 |
| JP | P2010-051154 A | 3/2010 |

OTHER PUBLICATIONS

Japanese Office Action dated Mar. 6, 2012, issued in corresponding Japanese Application No. 2010-098983, with English translation.

* cited by examiner

*Primary Examiner* — Adolf Berhane
(74) *Attorney, Agent, or Firm* — Nixon & Vanderhye PC

(57) ABSTRACT

A power converter is preferably mounted in a vehicle. The converter has a power converting unit including an electrical switching element electrically switched on and off selectively in response to a duty ratio of PWM (pulse-width modulation) signal given to the switching element. The converter further has a controller including a drive unit that generates the PWM signal, in addition to a controlling unit and a limiting unit. The controlling unit controls the duty ratio of the PWM signal such that a voltage inputted to the power converter is converted to a voltage to be outputted depending on the duty ratio. The limiting unit limits at least one of a time change amount of the duty ratio of the PWM signal and a maximum duty ratio of the PWM signal.

20 Claims, 24 Drawing Sheets

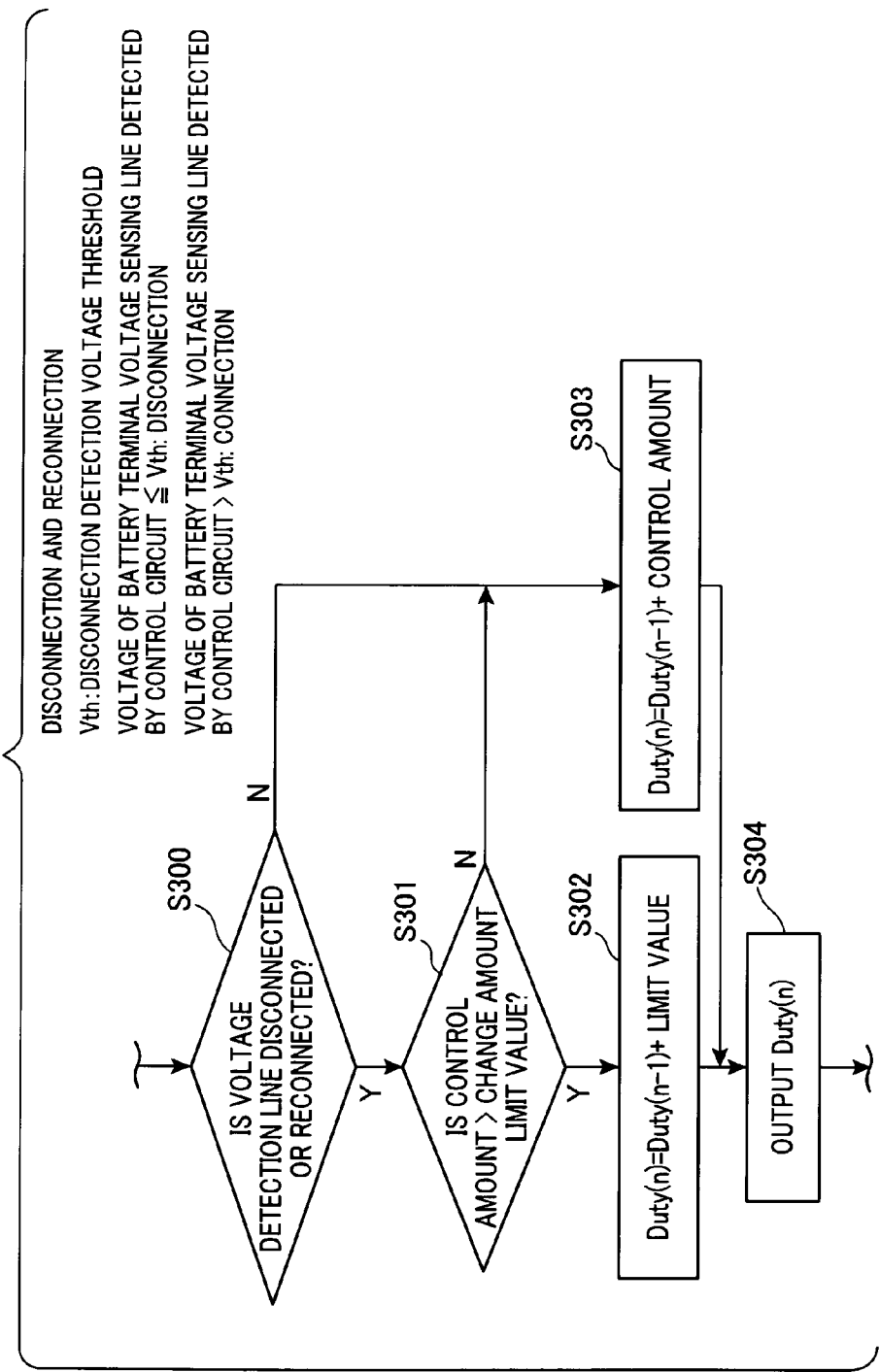

TIME CHANGE AMOUNT OF OUTPUT VOLTAGE
OF POWER CONVERSION CIRCUIT 10

POWER CONVERTER WITH ELECTRICAL SWITCHING ELEMENT

CROSS-REFERENCE TO RELATED APPLICATION

This application is based on and claims the benefit of priority from earlier Japanese Patent Application No. 2010-098983 filed Apr. 22, 2010, the description of which is incorporated herein by reference.

BACKGROUND OF THE INVENTION

1. Field of the Invention

The present invention relates to a power converter that converts input voltage and outputs the converted voltage by turning ON and OFF a switching element.

2. Description of the Related Art

Conventionally, for example, a power conversion system disclose in JP-A-2009-131067 is known as a power converter that converts input voltage and outputs the converted voltage by turning ON and OFF a switching element.

The power conversion system includes a power conversion circuit, a voltage sensor, a current sensor, and a control circuit. The power conversion circuit has a switching element, and converts input voltage and outputs the converted voltage by turning ON and OFF the switching element. The voltage sensor is connected to a control calculating section of the control circuit as a means for detecting input voltage and output voltage of the power conversion circuit. The current sensor is connected to the control calculating section as a means for detecting output current of the power conversion circuit. The control calculating section controls the switching element by outputting a pulse width modulation (PWM) signal for turning ON and OFF the switching element, based on the input and output voltages detected by the voltage sensor and the output current detected by the current sensor.

For example, when a disconnection occurs between the voltage sensor that detects the output voltage of the power conversion circuit and the control calculating section within the control circuit, the control calculating section judges that the output voltage has dropped and suddenly increases the duty ratio of the PWM signal. Therefore, until the disconnection is detected, the output voltage on a secondary side of the power conversion circuit temporarily rises. Therefore, the power conversion circuit is required to be configured using components having sufficient withstand voltage that take into consideration temporary rise in output voltage, such as that described above, on the secondary side and a circuit connected to the secondary side. A problem occurs in that cost increases.

SUMMARY

Hence it is desired to provide a power converter capable of suppressing rise in output voltage during transient response, such as that described above, and reducing the withstanding voltages of constituent components.

Regarding the above-described issues, as a result of at least either of an amount of change in duty ratio (duty ratio change amount) in relation to the period of the PWM signal and a maximum duty ratio being limited, the period over which the output voltage rises in accompaniment with a disconnection and the like, and an output voltage value on the secondary side are reduced. The withstanding voltages of the components on the secondary side are lowered.

Here, duty ratio refers to a ratio of the ON period and the OFF period of the switching element.

According to the configuration, as a result of the time change amount (i.e., the temporal amount of change) of the duty ratio of the PWM signal being limited, sudden change in output voltage of the power converting means can be suppressed, and rise in output voltage can be reduced. Therefore, even when a temporary transient response occurs, the withstanding voltages of the constituent components of the power converting means can be lowered. In addition, as a result of the maximum duty ratio being limited, even when the response time of the transient response is long, the withstanding voltages of the constituent components of the power converting means can be lowered by the secondary-side output voltage being limited.

According to the configuration, as described above, the rise in secondary-side output voltage can be suppressed, and the withstanding voltages of the secondary-side components of the power converting means can be lowered.

According to the configuration, on the power converting means side, when a disconnection has occurred between the power converting means and the battery, power is supplied from the battery to a load, and the voltage of the battery drops. In accompaniment, the voltage of the output terminal of the power converting means rises, and control is switched to control of the voltage of the output terminal of the power converting means. However, although the output voltage of the power converting means rises until the control state is switched, voltage rise can be suppressed as a result of the time change amount (i.e., the temporal amount of change) of the duty ratio being limited. In addition, as a result of the maximum duty ratio being limited, the maximum value of the rising voltage can be limited. Therefore, the withstanding voltage of the constituent components of the power converting means can be lowered.

According to the configuration, the control means switches the control state depending on whether or not a disconnection has occurred between the power converting means and the battery. When the disconnected power converting means and battery are reconnected, the control state is switched again. In this instance, because the control is switched in a state in which power is supplied from the battery to a load and the voltage of the battery is dropping, the difference between the voltage of the battery and the target voltage is large. As a result, in general, the output voltage transiently rises in accompaniment with feedback control. However, transient voltage rise can be suppressed as a result of the time change amount of the duty ratio of the PWM signal being limited when the control state is switched. In addition, voltage rise can be suppressed as a result of the maximum duty ratio being limited. Therefore, the withstanding voltages of the secondary-side components of the power converting means can be lowered.

According to the configuration, when a disconnection has occurred between the voltage detecting means and the control means, the terminal voltage of the battery is judged to have dropped, and the switching element is controlled such that the terminal voltage of the battery becomes the target voltage. Therefore, a transient change in the output voltage of the power converting means occurs, and the output voltage rises. However, a rise in the secondary-side voltage can be suppressed during the period until the control is switched as a result of the time change amount of the duty ratio being limited. In addition, the secondary-side maximum voltage can be suppressed by the maximum duty ratio being limited.

According to the configuration, a disconnection between the voltage detecting means and the control means can be judged with certainty. Transient change in which the output voltage rises occurs as a result of feedback control of the battery terminal voltage, during a fixed period after a disconnection has occurred between the voltage detecting means and the control means or a period until the control state is switched in accompaniment with a disconnection. However, the control means limits the time change amount of the duty ratio of the PWM signal during these periods. Therefore, a transient rise in the output voltage of the power converting means accompanying a disconnection between the voltage detecting means and the control means is suppressed. Thus, the withstanding voltages of the components on the secondary side can be suppressed as a result of the control state being switched during the period in which the transient rise in output voltage is being suppressed.

According to the configuration, the transient rise in output voltage of the power converting means can be judged with certainty without a separate detecting means for disconnection and the like being provided. Therefore, the rise in output voltage of the power converting means can be efficiently reduced.

According to the configuration, the rise in output voltage can be suppressed as a result of a transient response speed being predicted in advance, and a limit value of the time change amount of the duty ratio being provided. In addition, the secondary-side maximum voltage can be suppressed as a result of a limit value of the maximum duty ratio being provided. Therefore, the change in output voltage of the power converting means can be reduced with certainty.

The duty ratio during ordinary control is generally small when the input voltage is high and rises when the input voltage is low. Therefore, when the limit value of the time change amount of the duty ratio is set to a fixed value, the limit value is set taking into consideration an instance in which the input voltage is high and the output voltage is significantly affected, and the limit value of the time change amount of the duty ratio becomes small. As a result, the responsiveness of output when the input voltage is low may be reduced. Therefore, as a result of the limit value being lowered as the input voltage rises, optimization can be performed without loss of control responsiveness, and the change in output voltage can be efficiently reduced.

According to the configuration, in a manner similar to that in the power converter according to the ninth aspect, when the maximum duty ratio is set based on when the input voltage is high, the duty ratio for outputting the target voltage may become insufficient and the output voltage may not be ensured, when the input voltage is low. Therefore, as a result of the limit value being lowered as the input voltage rises, optimization can be performed without loss of control responsiveness, and the possibility of insufficient output voltage can be prevented. Furthermore, the rise in output voltage can be efficiently reduced.

According to the configuration, a disconnection detecting means, such as a detection line and an output line for the output voltage, is not required. In addition, even when transient fluctuations occur, such as sudden changes in input voltage and load, the rise in output voltage of the power converting means can be suppressed.

According to the configuration, as a result of the time change amount of the duty ratio and the like being limited when the output voltage is the target voltage or higher and the control amount increases, rise in output voltage can be suppressed while ensuring required output voltage responsiveness when the output voltage is less than the target voltage.

According to the configuration, when the target voltage is set to a low voltage when the target output voltage range is wide, the limit values of the time change amount of the duty ratio and the like are eliminated and control responsiveness is ensured. When the target voltage having no allowance regarding the rise in output voltage is set to a high voltage, the time change amount is limited. As a result, the withstanding voltages of the secondary-side components of the power converting means can be lowered, while ensuring control responsiveness.

According to the configuration, as a result of the time change amount of the duty ratio and the like being limited based on the difference between the output voltage and the target voltage, the threshold is set such as to allow the withstanding voltages of the secondary-side components. As a result, the withstanding voltages can be lowered while ensuring control responsiveness within a wide target voltage range.

According to the configuration, as a result of the output voltage response being delayed by the feedback gain being reduced, increase of the duty ratio can be suppressed, and the rise in the output voltage on the secondary side can be suppressed. In this instance, as a result of a stable feedback gain being selected, the rise in output voltage can be suppressed while maintaining the control state, and the withstanding voltages of the secondary components of the power converting means can be lowered.

According to the configuration, when the target voltage changes, if the target voltage at which the duty ratio during ordinary control becomes large is high based on a map, the maximum duty ratio can be set to a small value. If the target voltage at which the duty ratio during ordinary control becomes small is low, the maximum duty ratio can be set to a large value. As a result, the rise in secondary-side output voltage can be suppressed without loss of control performance when the target voltage is low.

According to the configuration, as a result of the limit values of the time change amount of the duty ratio and the like being set depending on the voltage value of the output terminal of the power converting means, the risen voltage can be estimated from the current voltage, and the limit value can be provided. When the voltage of the output terminal is low, the duty ratio limit value can be set to a large value because of allowance in relation to the risen voltage. Conversely, when the voltage of the output terminal is high, the duty ratio limit value can be set to a small value because the allowance is no longer present. As a result, the rise in secondary-side output voltage can be suppressed without loss of control responsiveness.

According to the configuration, the withstanding voltages of the constituent components of the power converter mounted in a vehicle can be lowered. In vehicles, such as hybrid vehicles and electric vehicles (EV), a power converter is used between two voltage systems of a main battery and an auxiliary battery. In the voltage systems, the fluctuation of input and output load is significant, and transient operations are often performed. Therefore, withstanding voltages can be effectively lowered.

BRIEF DESCRIPTION OF THE DRAWINGS

In the accompanying drawings:

FIG. 8 is a flowchart for explaining operations of the DC-DC converter in a fifth variation example according to the first embodiment;

DETAILED DESCRIPTION OF THE PREFERRED EMBODIMENTS

Embodiments of the present invention will hereinafter be described in further detail. According to a first embodiment, an example is given in which a power converter of the present invention is applied to a DC-DC converter that is mounted in a vehicle and steps down the voltage of a high-voltage battery and supplies the lowered voltage to a low-voltage battery.

First Embodiment

First, a configuration of the DC-DC converter will be described with reference to FIG. 1. Here, FIG. 1 is a circuit diagram of a DC-DC converter according to a first embodiment.

Figure 1:
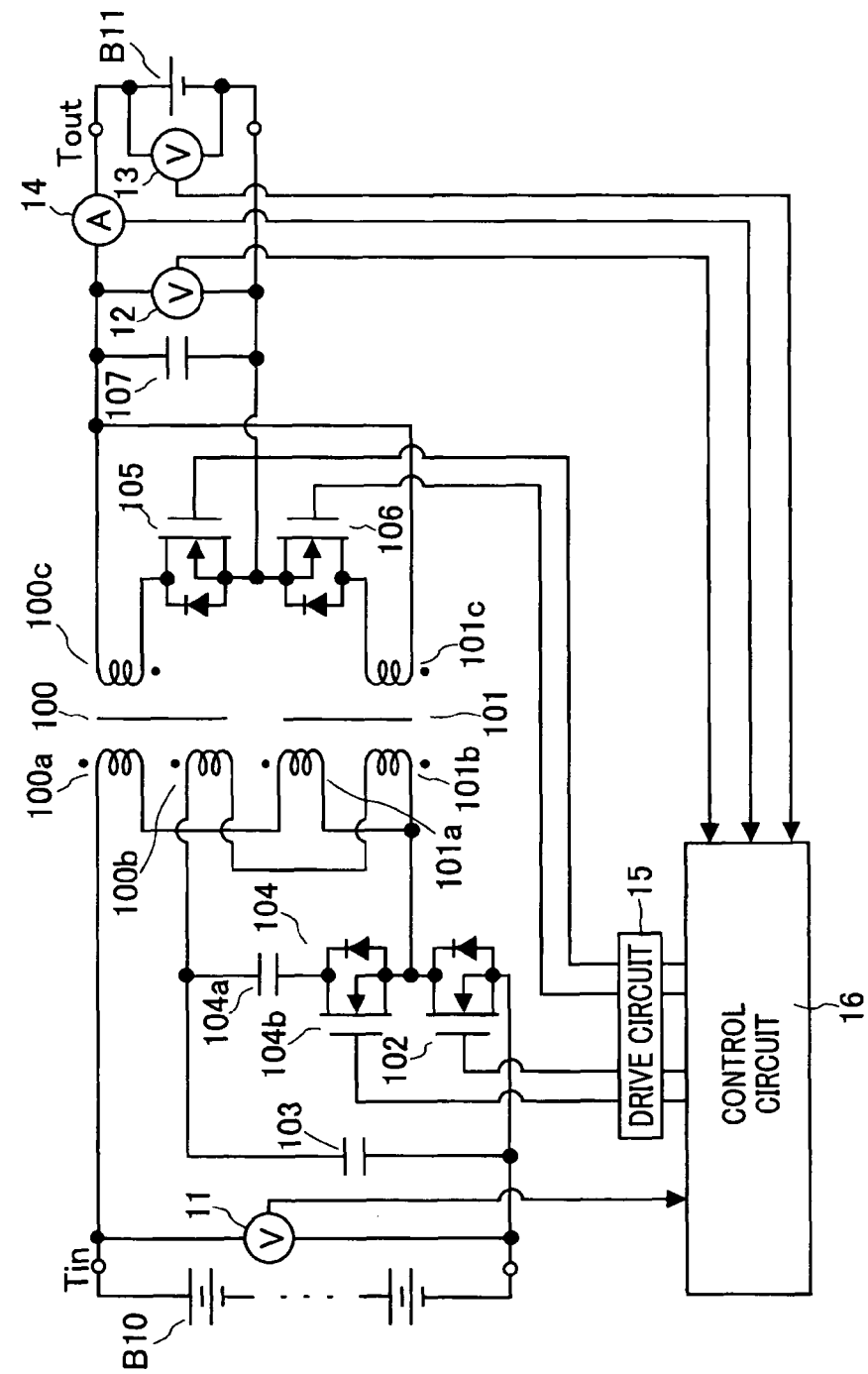
FIG. 1 is a circuit diagram of a DC-DC converter device according to a first embodiment.

As shown in FIG. 1, a DC-DC converter 1 (power converter) is a device that insulates and steps down high direct-current voltage outputted from a high-voltage battery B10, and supplies the lowered voltage to a low-voltage battery B11 (battery). In other words, the DC-DC converter 1 is a device that converts high direct-current voltage direct-current power to low direct-current voltage direct-current power and supplies the low direct-current voltage direct-current power.

The DC-DC converter 1 includes a power conversion circuit 10 (power converting means or power converting unit) and a controller to control operations of the power conversion circuit 10. The controller includes voltage sensors 11 and 12, a battery terminal voltage sensor 13 (voltage detecting means), a current sensor 14, a drive circuit 15, and a control circuit 16 (control means) composed of a computer system, for example, having a CPU (central processing unit) and various types of memories, not shown. Of course, the control circuit 16 can be realized by combining analogue and digital logic circuits such that these components have the functions equivalent shown in FIG. 2.

The power conversion circuit 10 is a circuit that insulates and steps down high direct-current voltage from the high-voltage battery B10 connected to an input terminal Tin, and supplies the lowered voltage to the low-voltage battery B11 connected to an output terminal Tout. In other words, the power conversion circuit 10 is a circuit that converts high direct-current voltage direct-current power to low direct-current voltage direct-current power and outputs the low direct-current voltage direct-current power. The power conversion circuit 10 includes transformers 100 and 101, a main switching element 102 (switching element), a capacitor 103, an active clamp circuit 104, output-side switching elements 105 and 106, and a smoothing capacitor 107. The power conversion circuit 10 steps down the inputted high direct-current voltage to a voltage based on a duty ratio and outputs the lowered voltage by turning ON and OFF the main switching element 102. Specifically, the output voltage rises as the ON period of the main switching element 102 becomes longer.

The transformers 100 and 101 are elements that step down alternating-current voltage inputted into a primary side and output the lowered voltage from a secondary side. The transformer 100 includes primary coils 100a and 100b, and a secondary coil 100c. The transformer 101 includes primary coils 101a and 101b, and a secondary coil 101c. The primary coils 100a, 101a, 101b, and 100b are serially connected in sequence. One end of the primary coil 100a that is one end of the serially connected primary coils 100a, 101a, 101b, and 100b is connected to a positive terminal of the high-voltage battery B10. One end of the primary coil 100b that is the other end of the serially connected primary coils 100a, 101a, 101b, and 100b is connected to the capacitor 103 and the active clamp circuit 104. In addition, one end of the secondary coil 100c is connected to the output-side switching element 105, and the other end is connected to the smoothing capacitor 107. One end of the secondary coil 101c is connected to the output-side switching element 106, and the other side is connected to the smoothing capacitor 107.

The main switching element 102 is an element that controls the voltage supplied from the high-voltage battery B10 to the primary coils 100a, 100b, 101a, and 101b, by being turned ON and OFF. Specifically, the main switching element 102 is a metal-oxide-semiconductor field-effect transistor (MOSFET). The main switching element 102 converts the direct-current voltage inputted from the high-voltage battery B10 to an alternating-current voltage, and supplies the alternating-current voltage to the primary coils 100a, 100b, 101a, and 101b, by being turned ON and OFF. The drain of the main switching element 102 is connected to a connection point between the primary coils 101a and 101b, and the source is connected to the negative terminal of the high-voltage battery B10. The gate is connected to the drive circuit 15.

The capacitor 103 is an element that is charged and discharged with the main switching element 102 being switched ON and OFF, and exchanges energy with the primary coils 100a, 101a, 101b, and 100b. One end of the capacitor 103 is connected to one end of the primary coil 100b that is the other end of the serially connected primary coils 100a, 101a, 101b, and 100b. The other end is connected to the negative terminal of the high-voltage battery B10.

The active clamp circuit 104 is a circuit that resets the transformers 100 and 101 during the OFF period of the main switching element 102. The active clamp circuit 104 includes a capacitor 104a and an auxiliary switching element 104b. The auxiliary switching element 104b is a MOSFET. The active clamp circuit 104 resets the transformers 100 and 101 during the OFF period of the main switching element 102 by turning ON and OFF the auxiliary switching element 104b in complement with the main switching element 102. The capacitor 104a and the auxiliary switching element 104b are connected in series. Specifically, one end of the capacitor 104a is connected to the drain of the auxiliary switching element 104b. The other end of the capacitor 104a that is one end of the serially connected capacitor 104a and auxiliary switching element 104b is connected to one end of the primary coil 100b that is the other end of the serially connected primary coils 100a, 101a, 101b, and 100b. In addition, the source of the auxiliary switching element 104b that is the other end of the serially connected capacitor 104a and auxiliary switching element 104b is connected to a connection point between the primary coils 101a and 101b. Furthermore, the gate of the auxiliary switching element 104b is connected to the drive circuit 15.

The output-side switching elements 105 and 106 are elements that rectify the alternating-current voltage of the secondary coils 100c and 101c by being turned ON and OFF. Specifically, the output-side switching elements 105 and 106 are MOSFET. The output-side switching element 105 is turned ON and OFF in complement with the main switching element 102, and the output-side switching element 106 is turned ON and OFF synchronously with the main switching element 102, thereby rectifying the alternating-current voltage of the secondary coils 100c and 101c. The source of the output-side switching element 105 is connected to the smoothing capacitor 107, and the drain is connected to one end of the secondary coil 100c. The gate is connected to the drive circuit 15. The source of the output-side switching element 106 is connected to the smoothing capacitor 107, and the drain is connected to one end of the secondary coil 101c. The gate is connected to the drive circuit 15.

The smoothing capacitor 107 is an element that smoothes the direct-current voltage rectified by the output-side switching elements 105 and 106. One end of the smoothing capacitor 107 is connected to the other ends of the secondary coils 100c and 101c, and the other end is connected to the sources of the output-side switching elements 105 and 106. In addition, one end of the smoothing capacitor 107 is connected to the positive terminal of the low-voltage battery B11, and the other end is connected to the negative terminal of the low-voltage battery B11.

The voltage sensor 11 is a sensor that detects the input voltage of the power conversion circuit 10. The voltage sensor 11 is connected to one end of the primary 100a that is one end of the serially connected primary coils 100a, 101a, 101b, and 100b, and to the other end of the capacitor 103. In addition, the signal output terminal is connected to the control circuit 16.

The voltage sensor 12 is a sensor that detects the output voltage of the power conversion circuit 10. The voltage sensor 12 is connected to both ends of the smoothing capacitor 107 that is the output terminal of the power conversion circuit 10. In addition, the signal output terminal is connected to the control circuit 16.

The battery terminal voltage sensor 13 is a sensor that detects a terminal voltage of the low-voltage battery B11. The battery terminal voltage sensor 13 is connected to the positive terminal and the negative terminal of the low-voltage battery B11. In addition, the signal output terminal is connected to the control circuit 16.

The current sensor 14 is a sensor that detects the output current of the power conversion circuit 10. The current sensor 14 is interposed between one end of the smoothing capacitor 107 and the positive terminal of the low-voltage battery B11. In addition, the signal output terminal is connected to the control circuit 16.

The drive circuit 15 is a circuit that turns ON and OFF the main switching element 102, the auxiliary switching element 104b, and the output-side switching elements 105 and 106 based on PWM signals, described hereafter, outputted from the control circuit 16. The signal input terminal of the drive circuit 15 is connected to the control circuit 16. The output terminal of the drive circuit 15 is connected to the respective gates of the main switching element 102, the auxiliary switching element 104b, and the output-side switching elements 105 and 106.

The control circuit 16 is a circuit that controls ON and OFF of the main switching element 102, the auxiliary switching element 104b, and the output-side switching elements 105 and 106 based on a target voltage, a target current, the input and output voltages and the output current of the power conversion circuit 10, and the terminal voltage of the low-voltage battery B11. The control circuit 16 outputs a PWM signal that prescribes the duty ratios of the main switching element 102, the auxiliary switching element 104b, and the output-side switching elements 105 and 106, based on a duty ratio. The control circuit 16 performs feedback calculation such that the terminal voltage of the low-voltage battery B11 becomes the target voltage when a disconnection has not occurred between the power conversion circuit 10 and the low-voltage battery B11, and the voltage of the output terminal of the power conversion circuit 10 becomes the target voltage when a disconnection has occurred between the power conversion circuit 10 and the low-voltage battery B11.

The control circuit 16 then adjusts the duty ratio of the PWM signal and outputs the PWM signal. When the output current of the power conversion circuit 10 exceeds a target current value (threshold value), the control circuit 16 performs feedback calculation such that the output current becomes the target current, adjusts the duty ratio of the PWM signal, and outputs the PWM signal. Furthermore, the control circuit 16 limits the time change amount of the duty ratio (i.e., an amount of temporal changes in the duty ratio) of the PWM signal. Specifically, the control circuit 16 adjusts the duty ratio of the PWM signal such that the time change amount of the duty ratio of the PWM signal becomes a predetermined limit set in advance or less, and outputs the adjusted PWM signal. The signal input terminal of the control circuit 16 is connected to the signal output terminals of the voltage sensors 11 and 12, the battery terminal voltage sensor 13, and the current sensor 14. The signal output terminal is connected to the signal input terminal of the drive circuit 15.

Figure 2:
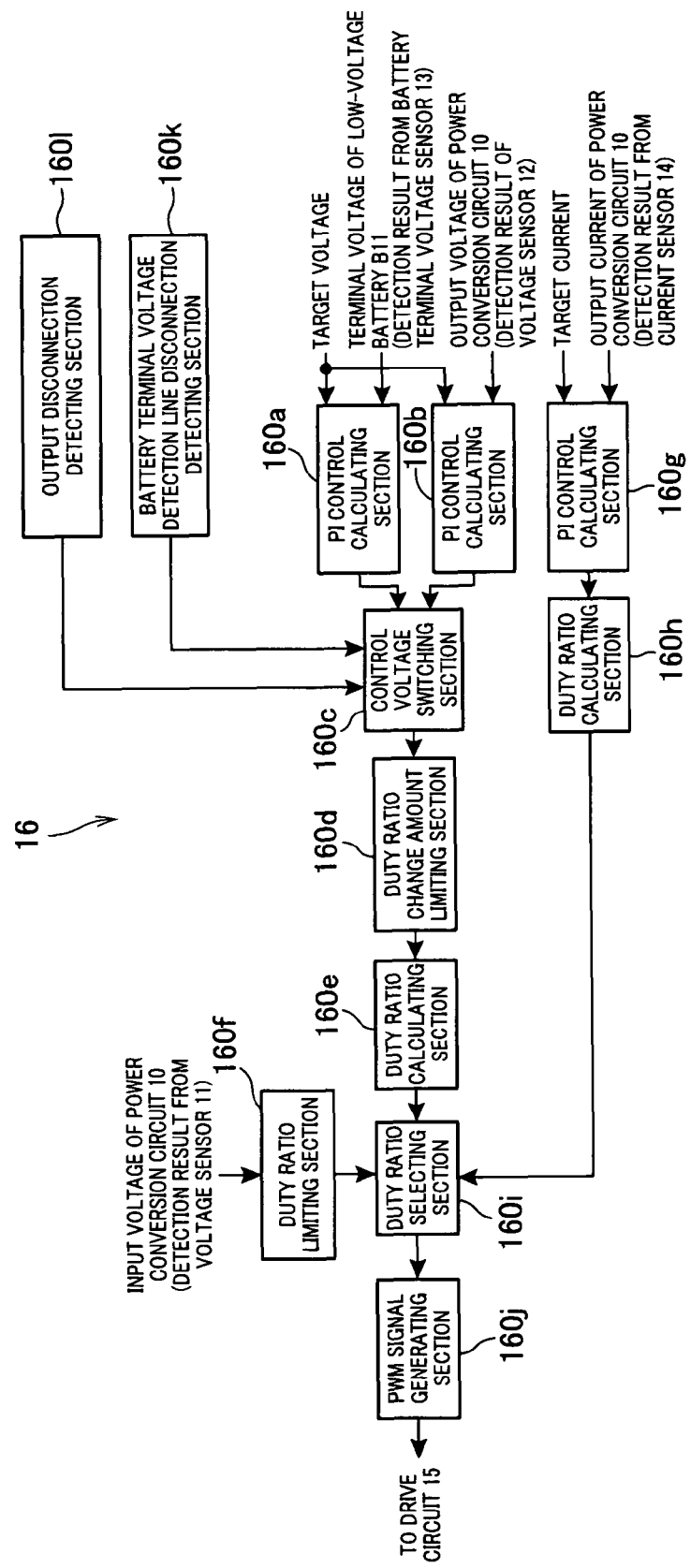
FIG. 2 is a block diagram of a control circuit in FIG. 1, which is functionally realized by a CPU.

Next, a configuration of the control circuit will be described in detail with reference to FIG. 2. Here, FIG. 2 is a block diagram of the control circuit in FIG. 1, which is functionally realized by the CPU (i.e., a computer system) incorporated in the control circuit 16.

The control circuit 16 has a microcomputer. As shown in FIG. 2, the control circuit 16 includes proportional-integral (PI) control calculating sections 160a and 160b, a control voltage switching section 160c, a duty ratio change amount limiting section 160d, a duty ratio calculating section 160e, a duty ratio limiting section 160f, a PI control calculating section 160g, a duty ratio calculating section 160h, a duty ratio selecting section 160i, and a PWM signal generating section 160j. The control circuit 16 also includes a battery terminal voltage detection line disconnection detecting section 160k and an output disconnection detecting section 160i. The control circuit 16 repeats calculations at a predetermined cycle, outputs the PWM signal, and separately receives supply from a system connected to the low-voltage battery B11 as a power supply for driving the control circuit 16.

The PI control calculating section 160a is a block that performs feedback control calculation of the difference of the terminal voltage of the low-voltage battery B11 in relation to the target voltage by multiplication with a proportional gain and an integral gain, calculates a duty ratio change amount that is the time change amount of the duty ratio of the PWM signal, and outputs the calculated duty ratio change amount. The PI control calculating section 160a is a block that controls the terminal voltage of the low-voltage battery B11.

The PI control calculating section 160b is a block that performs feedback control calculation of the difference of the output voltage of the power conversion circuit 10 in relation to the target voltage by multiplication with a proportional gain and an integral gain, calculates a duty ratio change amount that is the time change amount of the duty ratio of the PWM signal, and outputs the calculated duty ratio change amount. The PI control calculating section 160b is a block that controls the voltage of the output terminal of the voltage conversion circuit 10.

The control voltage switching section 160c is a block that switches between the duty ratio change amount outputted by the PI control calculating section 160a and the duty ratio change amount outputted by the PI control calculating section 160b depending on whether or not a disconnection has occurred between the power conversion circuit 10 and the low-voltage battery B11, and outputs the duty ratio change amount.

The control voltage switching section 160c switches between the duty ratio change amount outputted by the PI control calculating section 160a and the duty ratio change amount outputted by the PI control calculating section 160b, and outputs the duty ratio change amount, based on the detection result from the battery terminal voltage detection line disconnection detecting section 160k that detects disconnection of a battery terminal voltage detection line and the detection result from the output disconnection detecting section 160l that detects a disconnection between the power conversion circuit 10 and the low-voltage battery B11.

The battery terminal voltage detection line disconnection detecting section 160k judges whether or not a disconnection has occurred between the power conversion circuit 10 and the low-voltage battery B11 based on the terminal voltage of the low-voltage battery B11 detected by the battery terminal voltage sensor 13. Specifically, when the detection result from the battery terminal voltage sensor 13 is less than a predetermined threshold, the battery terminal voltage detection line disconnection detecting section 160k judges that a disconnection has occurred between the power conversion circuit 10 and the low-voltage battery B11.

The output disconnection detecting section 160l detects a disconnection between the power conversion circuit 10 and the low-voltage battery B11 from a difference between the input voltage inputted into the control circuit 16 to operate the control circuit 16 and the voltage of the output terminal of the power conversion circuit 10 detected by the voltage sensor 12.

The control voltage switching section 160c outputs a duty ratio change amount that is a control amount (i.e., a physical amount or variable to be controlled) based on the calculation result of the PI control calculating section 160a when a disconnection has not occurred between the power conversion circuit 10 and the low-voltage battery B11, and outputs a duty ratio change amount that is a control amount based on the calculation result of the PI control calculating section 160b when a disconnection has occurred between the power conversion circuit 10 and the low-voltage battery B11.

The duty ratio change amount limiting section 160d is a block that limits the duty ratio change amount outputted by the control voltage switching section 160c. When an absolute value of the duty ratio change amount outputted by the control voltage switching section 160c is a predetermined duty ratio change amount limit value (0 or a positive value) set in advance or greater, the duty ratio change amount limiting section 160d changes the absolute value to become the duty ratio change amount limit value and outputs the absolute value.

On the other hand, when the absolute value of the duty ratio change amount outputted by the control voltage switching section 160c is less than the duty ratio change amount limit value, the duty ratio change amount limiting section 160d outputs the duty ratio change amount outputted by the control voltage switching section 160c as is. As a result, the absolute value of the duty ratio change amount is limited to the duty ratio change amount limit value or less.

The duty ratio calculating section 160e is a block that calculates the duty ratio based on the duty ratio change amount outputted by the duty ratio change amount limiting section 160d. The duty ratio calculating section 160e calculates a current duty ratio by adding the duty ratio change amount outputted by the duty ratio change amount limiting section 160d to the previously calculated duty ratio and outputs the current duty ratio.

The duty ratio limiting section 160f is a block that outputs the duty ratio limit value based on the input voltage and the input voltage change amount of the power conversion circuit 10. The duty ratio limit value is set as protection against withstanding voltages of components, such as the switching elements 102 and 104b, of the power conversion circuit 10. The duty ratio limiting section 160f outputs a corresponding duty ratio limiting value based on a map of duty ratio limit values in relation to the input voltage of the power conversion circuit 10 set in advance, and a map of duty ratio limit values in relation to the input voltage change amount of the power conversion circuit 10.

The PI control calculating section 160g is a block that performs proportional and integral calculations of the difference of the output current of the power conversion circuit 10 in relation to the target current, calculates a duty ratio change amount that is the time change amount of the duty ratio of the PWM signal, and outputs the calculated duty ratio change amount. The PI control calculating section 160g is a block for controlling the output current of the power conversion circuit 10.

The duty ratio calculating section 160h is a block that calculates the duty ratio based on the duty ratio change amount outputted by the PI control calculating section 160g. The duty ratio calculating section 160h calculates a current duty ratio by adding the duty ratio change amount outputted by the PI control calculating section 160g to the previously calculated duty ratio, and outputs the current duty ratio.

The duty ratio selecting section 160i is a block that selects the smallest duty ratio from the duty ratios outputted by the duty ratio calculating sections 160e and 160h, and the duty ratio limiting section 160f, and outputs the selected duty ratio. When the output current of the power conversion circuit 10 is less than the threshold value, the duty ratio selecting section 160i selects the smallest duty ratio from the duty ratios outputted by the duty ratio calculating section 160e and the duty ratio limiting section 160f, and outputs the selected duty ratio. On the other hand, when the output current of the power conversion circuit 10 exceeds the threshold value, the duty ratio outputted by the duty ratio calculating section 160h becomes the smallest duty ratio, and the duty ratio selecting section 160i outputs the duty ratio outputted by the duty ratio calculating section 160h.

The PWM signal generating section 160j is a block that outputs a signal for driving the switching elements to the drive circuit 15, based on the duty ratio outputted by the duty ratio selecting section 160i.

Next, operations of the DC-DC converter will be described with reference to FIG. 1 and FIG. 2.

In FIG. 1, the control circuit 16 outputs the PWM signal for turning ON and OFF the main switching element 102, based on the target voltage, the target current, the input and output voltages of the power conversion circuit 10 detected by the voltage sensors 11 and 12, the terminal voltage of the low-voltage battery B11 detected by the battery terminal voltage sensor 13, and the output current of the power conversion circuit 10 detected by the current sensor 14. In addition, the control circuit 16 also outputs the PWM signal for turning ON and OFF the auxiliary switching element 104b in complement with the main switching element 102. Furthermore, the control circuit 16 also outputs the PWM signal for turning ON and OFF the output-side switching element 105 in complement with the main switching element 102, and the PWM signal for turning ON and OFF the output-side switching element 106 synchronously with the main switching element 102.

When a disconnection has not occurred between the power conversion circuit 10 and the low-voltage battery B11, the control circuit 16 adjusts the duty ratio of the PWM signal such that the terminal voltage of the low-voltage battery B11 becomes the target voltage, and outputs the PWM signal. When a disconnection has occurred between the power conversion circuit 10 and the low-voltage battery B11, the control circuit 16 adjusts the duty ratio of the PWM signal such that the voltage of the output terminal of the power conversion circuit 10 becomes the target voltage, and outputs the PWM signal. When the output current of the power conversion circuit 10 exceeds the threshold value, the control circuit 16 adjusts the duty ratio of the PWM signal such that the output current becomes the target current, and outputs the PWM signal.

Furthermore, the control circuit 16 adjusts the duty ratio of the PWM signal such that the time change amount of the duty ratio of the PWM signal is a predetermined limit value set in advance or less, and outputs the PWM signal.

When the PWM signal is inputted, the drive circuit 15 turns ON and OFF the main switching element 102 and the auxiliary switching element 104b in a complementary manner, in adherence to the duty ratio of the PWM signal.

When the main switching element 102 is turned ON and the auxiliary switching element 104b is turned OFF, current flows from the high-voltage battery B10 to the primary coils 100a and 101a. Current also flows from the charged capacitor 103 to the primary coils 100b and 101b. As a result, voltage that has been stepped down based on the coil turn ratio is induced in the secondary coil 101c. The voltage induced in the secondary coil 101c is rectified by the output-side switching element 106 that has been turned ON synchronously with the main switching element 120, smoothed by the smoothing capacitor 107, and supplied to the low-voltage battery B11.

Subsequently, when the main switching element 102 is turned OFF and the auxiliary switching element 104b is turned ON, the current that is flowing through the primary coils 100a and 101a flows through the primary coils 101b and 100b, and the capacitor 103 is charged. In addition, the current flows through the auxiliary switching element 104b and the capacitor 104a, and the capacitor 104a is charged. As a result, voltage that has been stepped down based on the coil turn ratio is induced in the secondary coil 100c. At this time, the voltage generated during the OFF period of the main switching element 120 is clamped, and the transformers 100 and 101 are reset. The voltage induced in the secondary coil 100c is rectified by the output-side switching element 105 that is turned ON in complement with the main switching element 102 being OFF, smoothed by the smoothing capacitor 107, and supplied to the low-voltage battery B11.

Subsequently, the above-described operations are repeatedly performed, and the voltage of the high-voltage battery B11 is stepped down to the target voltage, and supplied to the low-voltage battery B11.

Next, detailed operations of the control circuit will be described with reference to FIG. 2.

In FIG. 2, the PI control calculating section 160a outputs the duty ratio change amount based on the difference between the target voltage and the terminal voltage of the low-voltage battery B11. The PI control calculating section 160b outputs the duty ratio change amount based on the difference between the target voltage and the output voltage of the power conversion circuit 10. The control voltage switching section 160c judges whether or not a disconnection has occurred between the power conversion circuit 10 and the low-voltage battery B11 based on the detection result from the battery terminal voltage sensor 13.

When a disconnection has not occurred between the power conversion circuit 10 and the low-voltage battery B11, the control voltage switching section 160c outputs the duty ratio change amount of the PI control calculating section 160a. When a disconnection has occurred between the power conversion circuit 10 and the low-voltage battery B11, the control voltage switching section 160c outputs the duty ratio change amount of the PI control calculating section 160b.

The duty ratio change amount limiting section 160d limits the duty ratio change amount outputted by the control voltage switching section 160c. When the absolute value of the duty ratio change amount outputted by the control voltage switching section 160c is the duty ratio change amount limit value or more, the duty ratio change amount limiting section 160d changes the absolute value to become the duty ratio change amount limit value, and outputs the duty ratio change amount.

When the absolute value of the duty ratio change amount outputted by the control voltage switching section 160c is less than the duty ratio change amount limit value, the duty ratio change amount limiting section 160d outputs the duty ratio change amount outputted by the control voltage switching section 160c as is. As a result, the absolute voltage of the duty ratio change amount is limited to the duty ratio change amount limit value or less.

Then, the duty ratio calculating section 160e adds the duty ratio change amount outputted by the duty ratio change amount limiting section 160d to the previously calculated duty ratio, and outputs the result as the current duty ratio. As a result, when a disconnection has not occurred between the power conversion circuit 10 and the low-voltage battery B11, the duty ratio calculated based on the difference between the target voltage and the terminal voltage of the low-voltage battery B11 and having a limited duty ratio change amount is outputted to the duty ratio selecting section 160i. When a disconnection has occurred between the power conversion circuit 10 and the low-voltage battery B11, the duty ratio calculated based on the difference between the target voltage and the output voltage of the power conversion circuit 10 and having a limited duty ratio change amount is outputted to the duty ratio selecting section 160i.

In addition, the duty ratio limiting section 160f outputs the duty ratio limit value depending on the input voltage and the input voltage change amount of the power conversion circuit 10. The duty ratio limiting section 160f outputs a corresponding duty ratio limit value to the duty ratio selecting section 160i, based on the map of the duty ratio limit values in relation to the input voltage of the power conversion circuit 10 and the map of the duty ratio limit values in relation to the input voltage change amount of the power conversion circuit 10.

Furthermore, the PI control calculating section 160g outputs the duty ratio change amount based on the difference between the target current and the output current of the voltage conversion circuit 10. Then, the duty ratio calculating section 160h adds the duty ratio change amount outputted by the PI control calculating section 160g to the previously calculated duty ratio, and outputs the result as the current duty ratio. As a result, the duty ratio calculated based on the difference between the target current and the output current of the power conversion circuit 10 is outputted to the duty ratio selecting section 160i.

The duty ratio selecting section 160i selects the smallest duty ratio from the duty ratios outputted by the duty ratio calculating sections 160e and 160h, and the duty ratio limiting section 160f, and outputs the selected duty ratio. When the output current of the power conversion circuit 10 is less than the threshold value, the duty ratio selecting section 160i selects the smallest duty ratio from the duty ratios outputted by the duty ratio calculating section 160e and the duty ratio limiting section 160f, and outputs the selected duty ratio to the PWM signal generating section 160j. On the other hand, when the output current of the power conversion circuit 10 exceeds the threshold, the duty ratio outputted by the duty ratio calculating section 160h becomes the smallest duty ratio, and the duty ratio outputted by the duty ratio calculating section 160h is outputted to the PWM signal generating section 160j. The PWM signal generating section 160j then generates the PWM signal based on the duty ratio outputted by the duty ratio selecting section 160i and outputs the PWM signal to the drive circuit 15.

As a result, when a disconnection has not occurred between the power conversion circuit 10 and the low-voltage battery B11, the duty ratio of the PWM signal is adjusted such that the terminal voltage of the low-voltage battery B11 becomes the target voltage, and the adjusted PWM signal is outputted. When a disconnection has occurred between the power conversion circuit 10 and the low-voltage battery B11, the duty ratio of the PWM signal is adjusted such that the voltage of the output terminal of the power conversion circuit 10 becomes the target voltage, and the PWM signal is outputted. In addition, when the output current of the power conversion circuit 10 exceeds the threshold value, the duty ratio of the PWM signal is adjusted such that the output current becomes the target current, and the adjusted PWM signal is outputted. Furthermore, the duty ratio of the PWM signal is adjusted such that the time change amount of the duty ratio of the PWM signal becomes a predetermined limit value set in advance or below.

Figure 3:
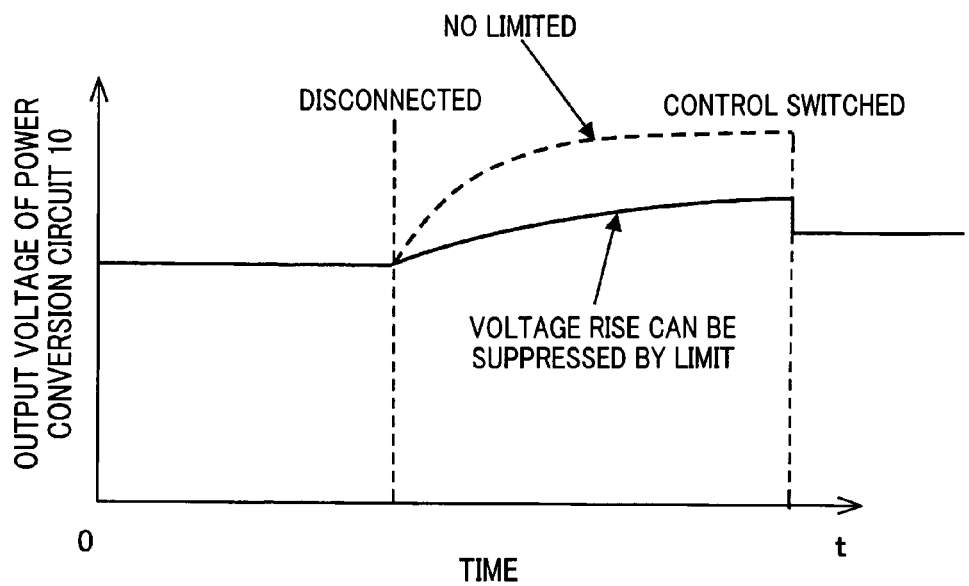
FIG. 3 is a graph of output voltage waveforms of a power conversion circuit.

Next, effects will be described. According to the first embodiment, because the duty ratio change amount limiting section 160d of the control circuit 16 limits the duty ratio change amount that is the time change amount of the duty ratio of the PWM signal, sudden change in the output voltage of the power conversion circuit 10 can be suppressed, as shown in FIG. 3. As a result, in the DC-DC converter that is mounted in a vehicle and switches the control state of voltage control depending on whether or not a disconnection has occurred between the power conversion circuit 10 and the low-voltage battery B11, the rise in output voltage of the power conversion circuit 10 can be reduced. Therefore, even when a temporary transient response occurs, the withstanding voltages of the constituent components of the power conversion circuit 10 can be lowered.

In addition, according to the first embodiment, when a disconnection has occurred between the power conversion circuit 10 and the low-voltage battery B11, power is supplied from the low-voltage battery B11 to a load, and the voltage of the low-voltage battery B11 drops. In accompaniment, the voltage of the output terminal of the power conversion circuit 10 rises. Therefore, control is switched to control of the voltage of the output terminal of the power conversion circuit 10. However, although the output voltage of the power conversion circuit 10 rises until the control state is switched, the voltage rise can be suppressed as a result of the time change amount of the duty ratio being limited. Therefore, the withstanding voltages of the constituent components of the power conversion circuit 10 can be lowered.

Furthermore, according to the first embodiment, the duty ratio change amount limiting section 160d of the control circuit 16 adjusts the duty ratio of the PWM signal such that the absolute value of the duty ratio change amount is the duty ratio change amount limit value or less, and outputs the adjusted PWM signal. As a result of the transient response speed being predicted in advance and a limit value for the time change amount of the duty ratio being provided, the rise in output voltage can be suppressed. Therefore, the change in output voltage of the power conversion circuit 10 can be reduced with certainty.

According to the first embodiment, an example is given in which the time change amount of the duty ratio is limited as a result of the duty ratio change amount limit value being set to a predetermined value. However, the present invention is not limited thereto, and the following is possible.

First Variation Example According to the First Embodiment

Figure 4:
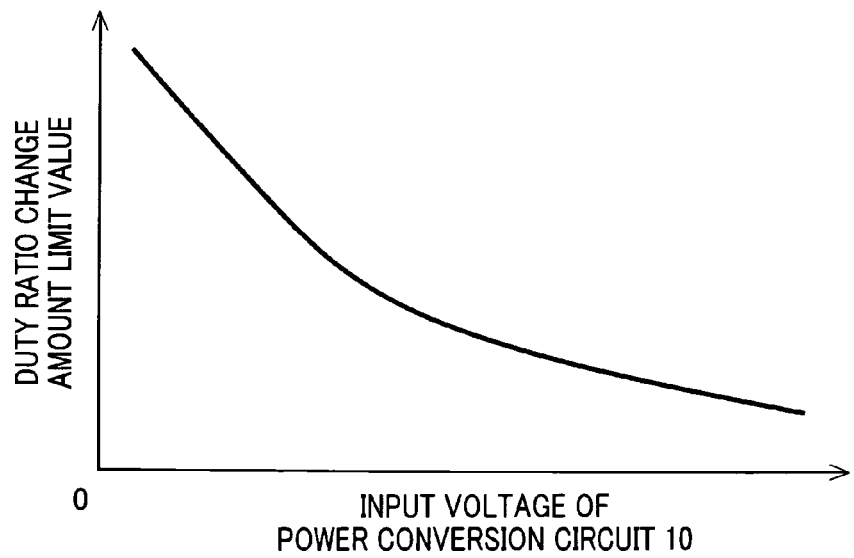
FIG. 4 is a map of duty ratio change amount limit values in relation to input voltage of the power conversion circuit in a first variation example according to the first embodiment.

As shown in FIG. 4, the duty ratio change amount limit value may be lowered as the input voltage of the power conversion circuit 10 rises. The duty ratio during ordinary control is generally small when the input voltage is high and rises when the input voltage is low. Therefore, when the limit value of the time change amount of the duty ratio is set to a fixed value, the limit value is set taking into consideration an instance in which the input voltage is high and the output voltage is significantly affected, and the limit value of the time change amount of the duty ratio becomes small. As a result, the responsiveness of output when the input voltage is low may be reduced. Therefore, as a result of the limit value being lowered as the input voltage rises, optimization can be performed without loss of control responsiveness, and the change in output voltage can be efficiently reduced.

Second Variation Example According to the First Embodiment

Figure 5:
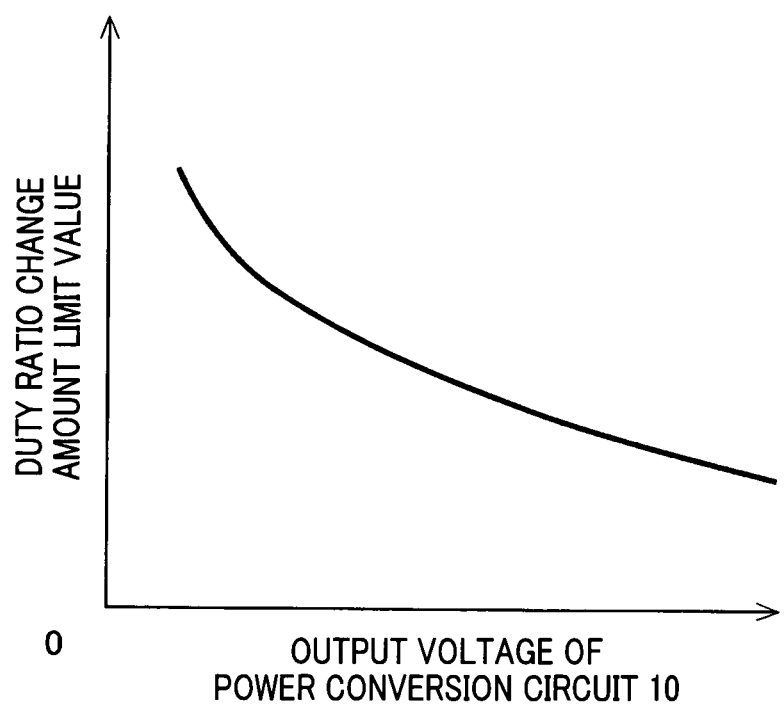
FIG. 5 is a map of duty ratio change amount limit values in relation to output voltage of the power conversion circuit in a second variation example according to the first embodiment.

As shown in FIG. 5, the limit value of the duty ratio time change amount may be set depending on the voltage value of the output terminal of the power conversion circuit 10. As a result of the limit value of the time change amount of the duty ratio being set depending on the voltage value of the output terminal of the power conversion circuit 10, the risen voltage can be estimated from the current voltage, and the limit value can be provided. When the voltage of the output terminal is low, the duty ratio limit value can be set to a large value because of allowance in relation to the risen voltage. Conversely, when the voltage of the output terminal is high, the duty ratio limit value can be set to a small value because the allowance is no longer present. As a result, the rise in secondary-side output voltage can be suppressed without loss of control responsiveness.

Third Variation Example According to the First Embodiment

The time change amount of the duty ratio of the PWM signal may be limited by the feedback gain being reduced.

Operations will be described with reference to FIG. 6. Here, FIG. 6 is a flowchart for explaining the operations of the DC-DC converter in the third variation example according to the first embodiment.

Figure 6:
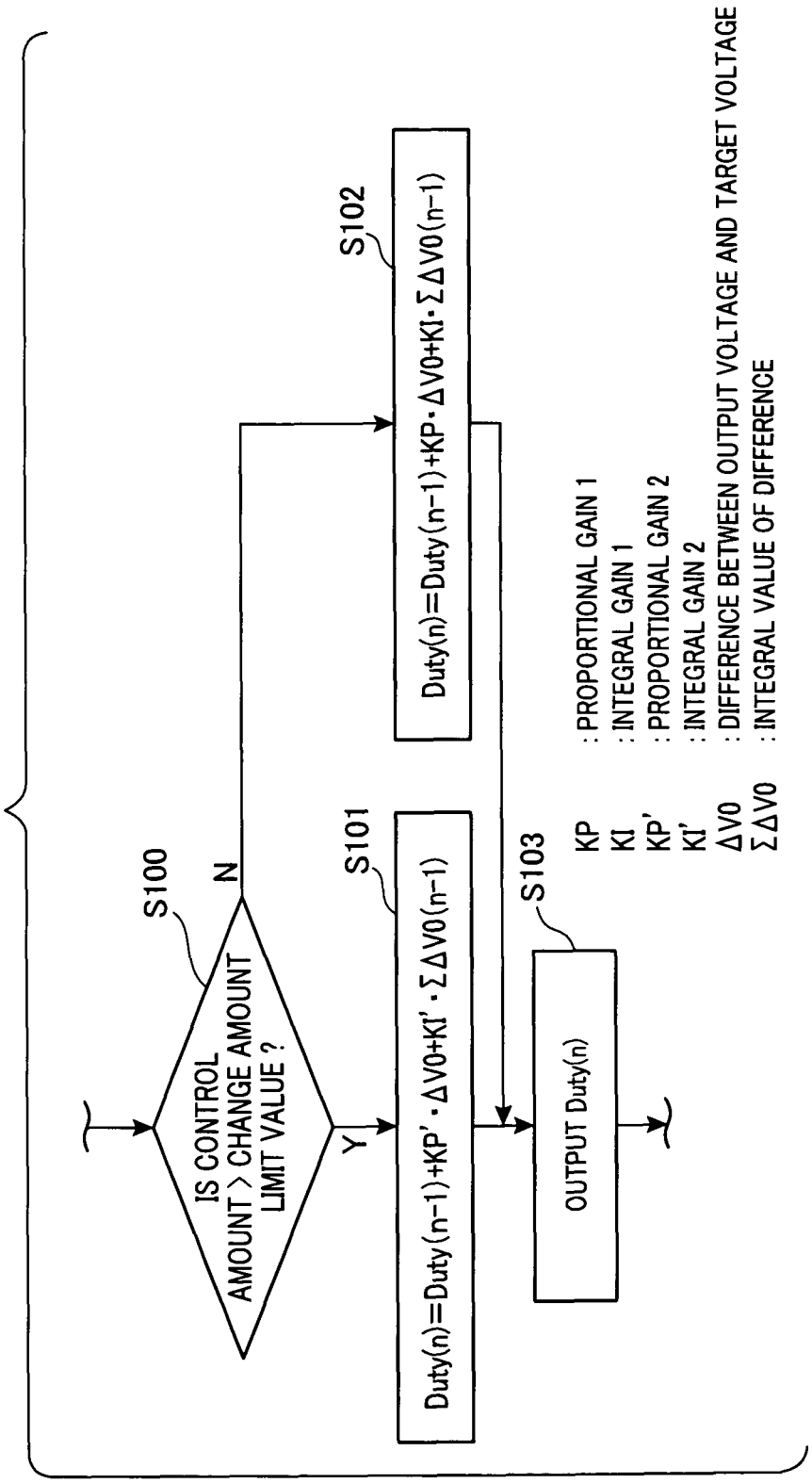
FIG. 6 is a flowchart for explaining operations of the DC-DC converter in a third variation example according to the first embodiment.

As shown in FIG. 6, the control circuit 16 judges whether or not the control amount is greater than the change amount limit value (S100). When judged at Step S100 that the control amount is greater than the change amount limit value, the control circuit 16 adds KP'·ΔV0+KI'·ΣΔV0(n−1) to the previous duty ratio Duty(n−1) and sets the result as the current duty ratio Duty(n) (S101).

On the other hand, when judged at Step S100 that the control amount is the change amount limit value or less, the control circuit 16 adds KP·ΔV0+KI·ΣΔV0(n−1) to the previous duty ratio Duty(n−1) and sets the result as the current duty ratio Duty(n) (S102). The control circuit 16 then outputs the current duty ratio Duty(n) (S103).

Here, KP is a proportional gain 1, KP' is a proportional gain 2, KI is an integral gain 1, KI' is an integral gain 2, ΔV0 is the difference between the output voltage and the target voltage, and ΣΔV0 is an integral value of the difference.

As a result of the output voltage response being delayed by the feedback gain being reduced, increase of the duty ratio can be suppressed, and the increase in the output voltage on the secondary side can be suppressed. In this instance, as a result of a stable feedback gain being selected, the rise in output voltage can be suppressed while maintaining the control state, and the withstanding voltages of the secondary components of the power conversion circuit 10 can be lowered.

In addition, according to the first embodiment, an example is given in which, during voltage control in which the terminal voltage of the low-voltage battery B11 or the output voltage of the power conversion circuit 10 is controlled to become the target voltage, the duty ratio change amount control section 160d limits the duty ratio change amount at all times. However, the period over which the duty ratio change value is limited is not limited thereto. The duty ratio change amount may be limited based on the conditions described below.

(Fourth Variation Example According to the First Embodiment)

The duty ratio change amount may be limited when the control state is switched in accompaniment with whether or not a disconnection has occurred between the power conversion circuit 10 and the low voltage battery B11.

Operations will be described with reference to FIG. 7. Here, FIG. 7 is a flowchart for explaining the operations of the DC-DC converter in the fourth embodiment according to the first embodiment.

Figure 7:
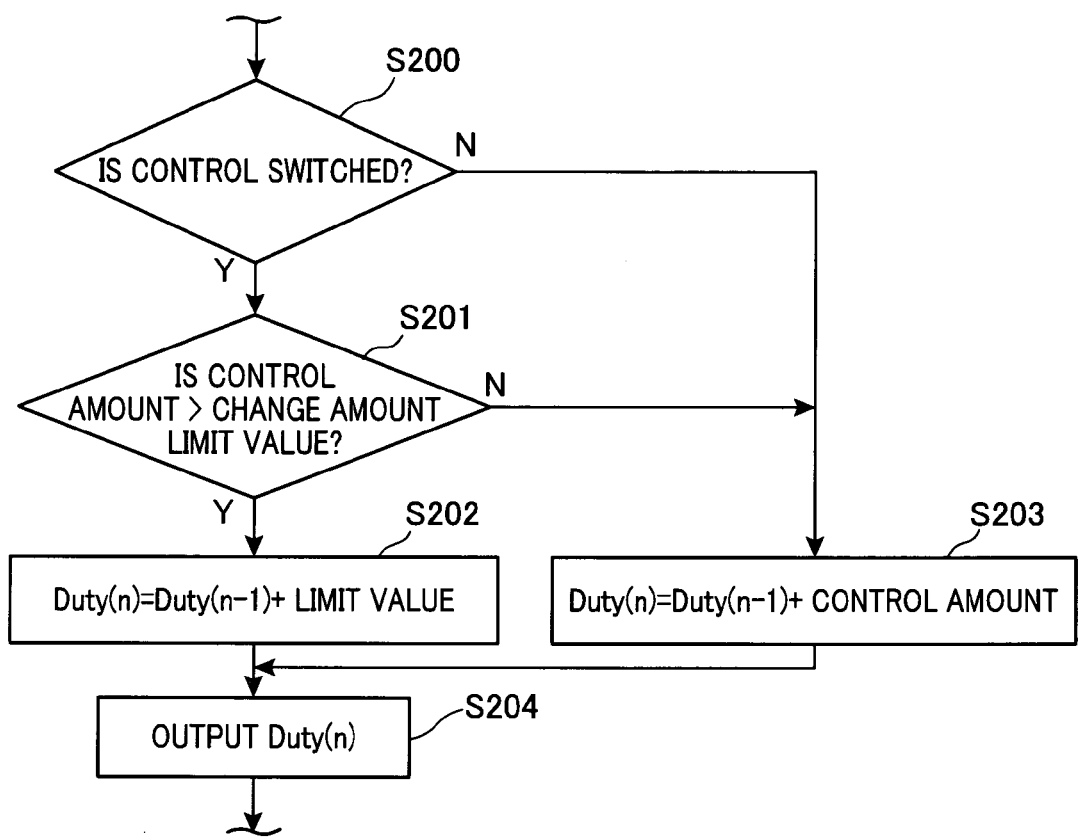
FIG. 7 is a flowchart for explaining operations of the DC-DC converter in a fourth variation example according to the first embodiment.

As shown in FIG. 7, the control circuit 16 judges whether or not the control state has been switched in accompaniment with whether or not a disconnection has occurred between the power conversion circuit 10 and the low-voltage battery B11 (S200). When judged at Step S200 that the control state has been switched, the control circuit 16 further judges whether the control amount is greater than the change amount limit value (S201). When judged at Step S201 that the control amount is greater than the change amount limit value, the control circuit 16 adds the limit value to the previous duty ratio Duty(n−1) and sets the result as the current duty ratio Duty(n) (S202).

On the other hand, when judged at S200 that the control state has not been switched or when judged at S201 that the control amount is the change amount limit value or less, the control circuit 16 adds the control amount to the previous duty ratio Duty(n−1) and sets the result as the current duty ratio Duty(n) (S203). The control circuit 16 then outputs the current duty ratio Duty(n) (S204).

The control circuit 16 switches the control state in accompaniment with whether or not a disconnection has occurred between the power conversion circuit 10 and the low-voltage battery B11. When the disconnected power conversion circuit 10 and the low-voltage battery B11 are reconnected, the control state is switched again.

In this instance, the control is switched in a state in which power is supplied to a load from the low-voltage battery B11 and the voltage of the battery is dropping. Therefore, the difference between the voltage and the target voltage is large.

Thus, although in general, the output voltage transiently rises with the feedback control, transient voltage rise can be suppressed when the control is switched as a result of the time change amount of the duty ratio of the PWM signal being limited. As a result, the withstanding voltages of the secondary components of the power conversion circuits 10 can be lowered.

Fifth Variation Example According to the First Embodiment

The duty ratio change amount may be limited when a disconnection occurs between the battery terminal voltage sensor 13 and the control circuit 16.

Operations will be described with reference to FIG. 8. Here, FIG. 8 is a flowchart for explaining the operations of the DC-DC converter in a fifth variation example according to the first embodiment.

As shown in FIG. 8, the control circuit 16 judges whether a disconnection or a reconnection has occurred between the battery terminal voltage sensor 13 and the control circuit 16 (S300). Specifically, the control circuit 16 judges that a disconnection has occurred when the detected voltage from a battery terminal voltage sensing line is judged to be less than or equal to a disconnection detection voltage threshold value Vth. The control circuit 15 judges that the battery terminal voltage sensor 13 and the control circuit 16 are connected when the output voltage is higher than the disconnection detection voltage threshold value Vth. Subsequently, in a manner similar to the fourth variation example, the control circuit 16 outputs the current duty ratio Duty(n) after performing Step S301 to Step S303 (S304).

When a disconnection occurs between the battery terminal voltage sensor 13 and the control circuit 16, the control circuit 16 judges that the terminal voltage of the low-voltage battery B11 has dropped, and controls the main switching element 102 such that the terminal voltage of the low-voltage battery B11 becomes the target voltage. Therefore, a transient change in the output voltage of the power conversion circuit 10 occurs, and the output voltage rises. However, as a result of the time change amount of the duty ratio being limited, the rise in secondary-side voltage during the period until the control is switched can be suppressed. In addition, as a result of the maximum duty ratio being limited, the secondary-side maximum voltage can be suppressed.

Sixth Variation Example According to the First Embodiment

The duty ratio change amount may be limited during a fixed period after a disconnection has occurred between the battery terminal voltage sensor 13 and the control circuit 16 is judged to have occurred, or a period until the control state is switched in accompaniment with a disconnection.

Operations will be described with reference to FIG. 8. In FIG. 8, the control circuit 16 performs Step S301 to Step S303 based on the judgment result at Step S300, during the fixed period after a disconnection is judged to have occurred or the period until the control state is switched in accompaniment with the disconnection. Step S301 to Step S303 are not performed after the period has elapsed.

During the fixed period after the disconnection has occurred between the battery terminal voltage sensor 13 and the control circuit 16 or the period until the control state is switched in accompaniment with the disconnection, a transient change in which the output voltage rises as a result of feedback control of the terminal voltage of the low-voltage battery occurs.

Therefore, as a result of the duty ratio change amount being limited during these periods, the transient rise in output voltage of the power conversion circuit 10 accompanying the disconnection between the battery terminal voltage sensor 13 and the control circuit 16 is suppressed. Therefore, the withstanding voltages of the secondary-side components can be suppressed as a result of the control state being switched during the period in which the transient rise in output voltage is being suppressed.

Seventh Variation Example According to the First Embodiment

The duty ratio change amount may be limited when the time change amount of the output voltage of the power conversion circuit 10 exceeds a threshold value.

Operations will be described with reference to FIG. 9. Here, FIG. 9A and FIG. 9B are graphs of an output voltage waveform of the power conversion circuit and a duty ratio change range when the duty ratio time change amount is limited in a seventh variation example according to the first embodiment.

Figure 9A:
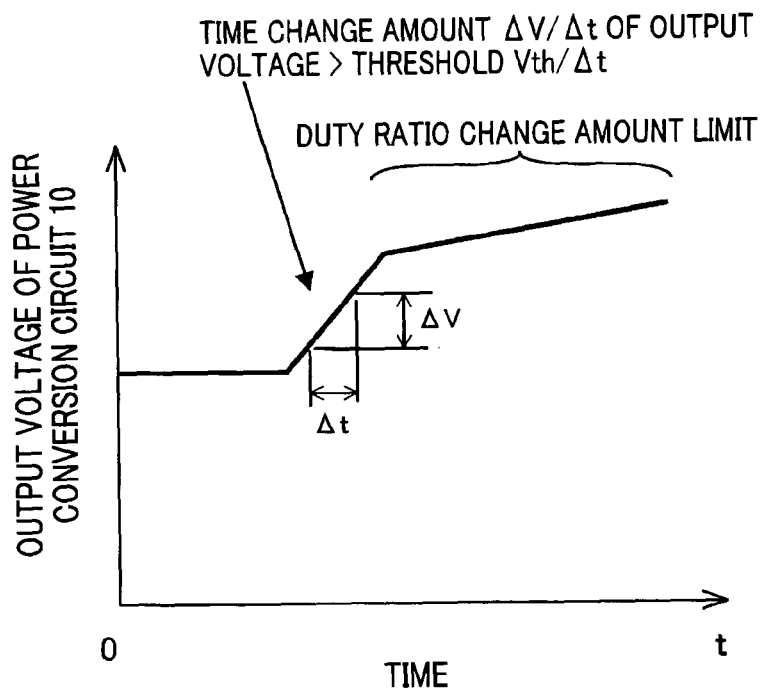
FIG. 9A and FIG. 9B are graphs of an output voltage waveform of the power conversion circuit and a duty ratio fluctuation range in relation to output voltage, when duty ratio time change amount is limited in a seventh variation example according to the first embodiment.
Figure 9B:
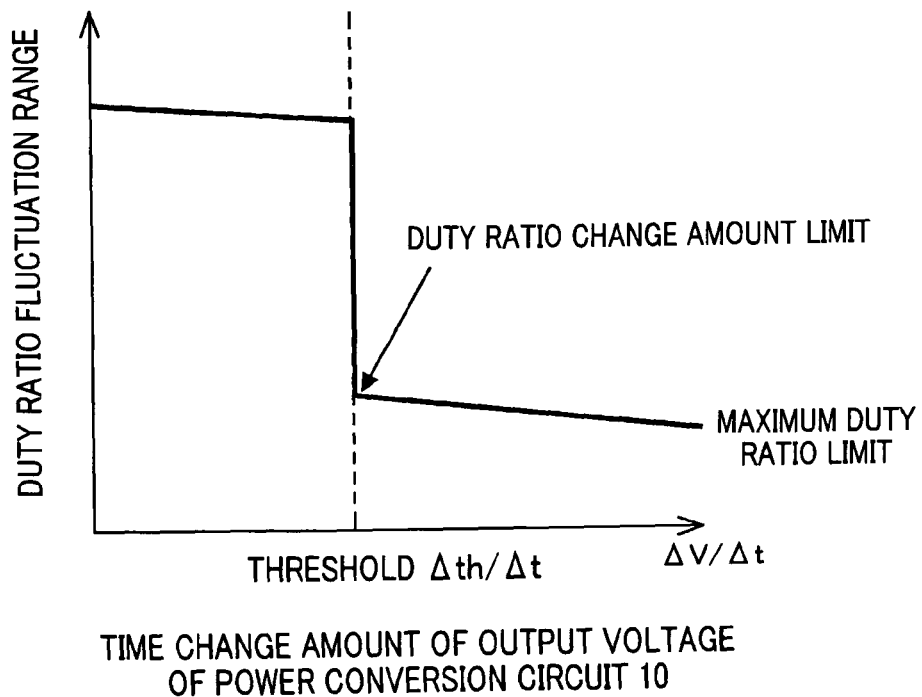

When the time change amount $\Delta V/\Delta t$ of the output voltage exceeds a threshold $\Delta Vth/\Delta t$ as shown in FIG. 9A, the control circuit 16 limits the duty ratio time change amount as shown in FIG. 9B. As a result, the rise in output voltage is reduced as shown in FIG. 9A.

Transient rise in output voltage of the power conversion circuit 10 can be judged with certainty without a separate detecting means for disconnections and the like being provided. Therefore, the rise in output voltage of the power conversion circuit 10 can be efficiently reduced.

Eighth Variation Example According to the First Embodiment

The duty ratio time change amount may be limited when the output voltage is the target voltage or higher and the control amount is increased.

Figure 10:
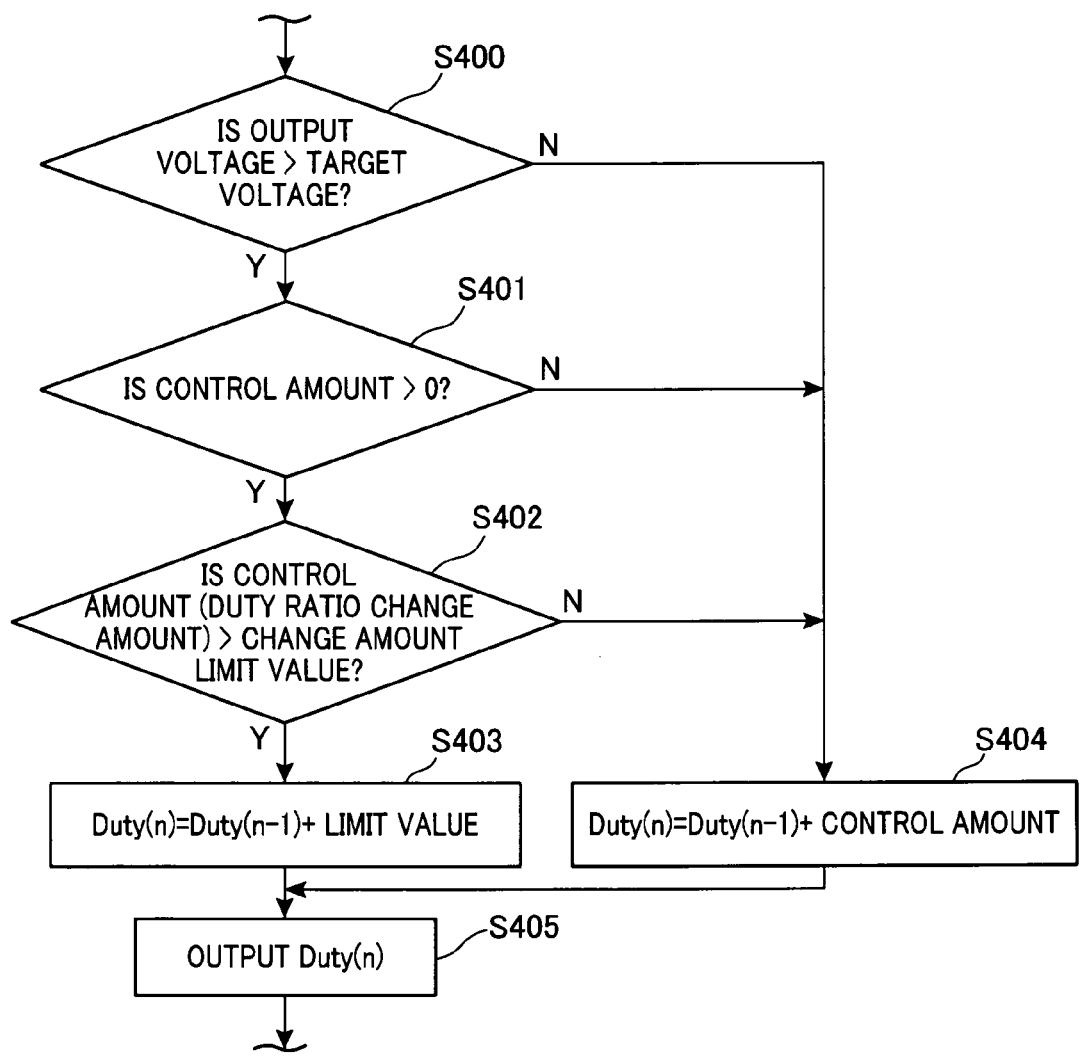
FIG. 10 is a flowchart for explaining operations of the DC-DC converter in an eight variation example according to the first embodiment.

Operations will be described with reference to FIG. 10. FIG. 10 is a flowchart for explaining the operations of the DC-DC converter in the eighth example according to the first embodiment.

As shown in FIG. 10, the control circuit 16 judges whether or not the output voltage of the power conversion circuit 10 is higher than the target voltage (S400). When judged at Step S400 that the output voltage is higher than the target voltage, the control circuit 16 further judges whether or not the control amount is greater than zero (S401). When judged at S401 that the control amount is greater than zero, the control circuit 16 further judges whether or not the control amount (duty ratio change amount) is greater than the change amount limit value (S402). When judged at Step S402 that the control amount (duty ratio change amount) is greater than the change amount limit value, the control circuit 16 adds the limit value to the previous duty ratio Duty(n−1) and sets the result as the current duty ratio Duty(n) (S403).

On the other hand, when judged at Step S400 that the output voltage is the target voltage or less, when judged at Step S401 that the control amount is zero or less, or when judged at Step S402 that the control amount (duty ratio change amount) is the change amount limit value or less, the control circuit 16 adds the control amount to the previous duty ratio Duty(n−1) and sets the result as the current duty ratio Duty(n) (S404). The control circuit 16 then outputs the current duty ratio Duty(n) (S405).

As a result of the time change amount of the duty ratio and the like being limited when the output voltage is the target voltage or higher and the control amount increases, rise in output voltage can be suppressed while ensuring required output voltage responsiveness when the output voltage is less than the target voltage.

Ninth Variation Example According to the First Embodiment

The duty ratio time change amount may be limited when the target voltage is a threshold value or more.

Operations will be described with reference to FIG. 11. Here, FIG. 11 is a flowchart for explaining the operations of the DC-DC converter in a ninth variation example according to the first embodiment.

Figure 11:
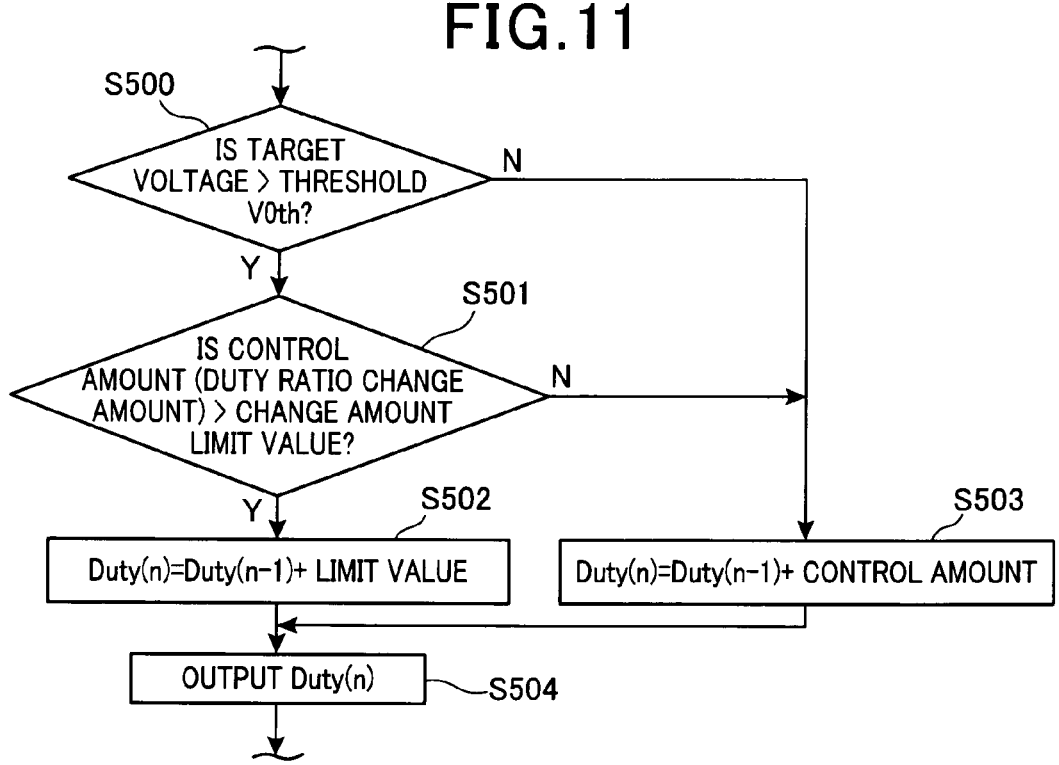
FIG. 11 is a flowchart for explaining operations of the DC-DC converter in a ninth variation example according to the first embodiment.

As shown in FIG. 11, the control circuit 16 judges whether or not the target voltage is higher than a threshold value V0th (S500). When judged at Step S500 that the target voltage is higher than the threshold V0th, the control circuit 16 further judges whether or not the control amount (duty ratio change amount) is greater than the change amount limit value (S501). When judged at Step S501 that the control amount (duty ratio change amount) is greater than the change amount limit value, the control circuit 16 adds the limit value to the previous duty ratio Duty(n−1) and sets the result as the current duty ratio Duty(n) (S502).

On the other hand, when judged at Step S500 that the target voltage is the threshold value V0th or less or when judged at Step S501 that the control amount (duty ratio change amount) is the change amount limit value or less, the control circuit 16 adds the control amount to the previous duty ratio Duty(n−1) and sets the result as the current duty ratio Duty(n) (S504).

When the target voltage is set to a low voltage when the target output voltage range is wide, the limit value of the time change amount of the duty ratio is eliminated and control responsiveness is ensured. When the target voltage having no allowance regarding the rise in output voltage is set to a high voltage, the time change amount is limited. As a result, the withstanding voltages of the secondary-side components of the power conversion circuit 10 can be lowered, while ensuring control responsiveness.

Tenth Variation Example According to the First Embodiment

The duty ratio time change amount may be limited when the difference between the output voltage and the target voltage is a threshold value or more.

Operations will be described with reference to FIG. 12. Here, FIG. 12 is a flowchart for explaining the operations of the DC-DC converter in a tenth variation example according to the first embodiment.

Figure 12:
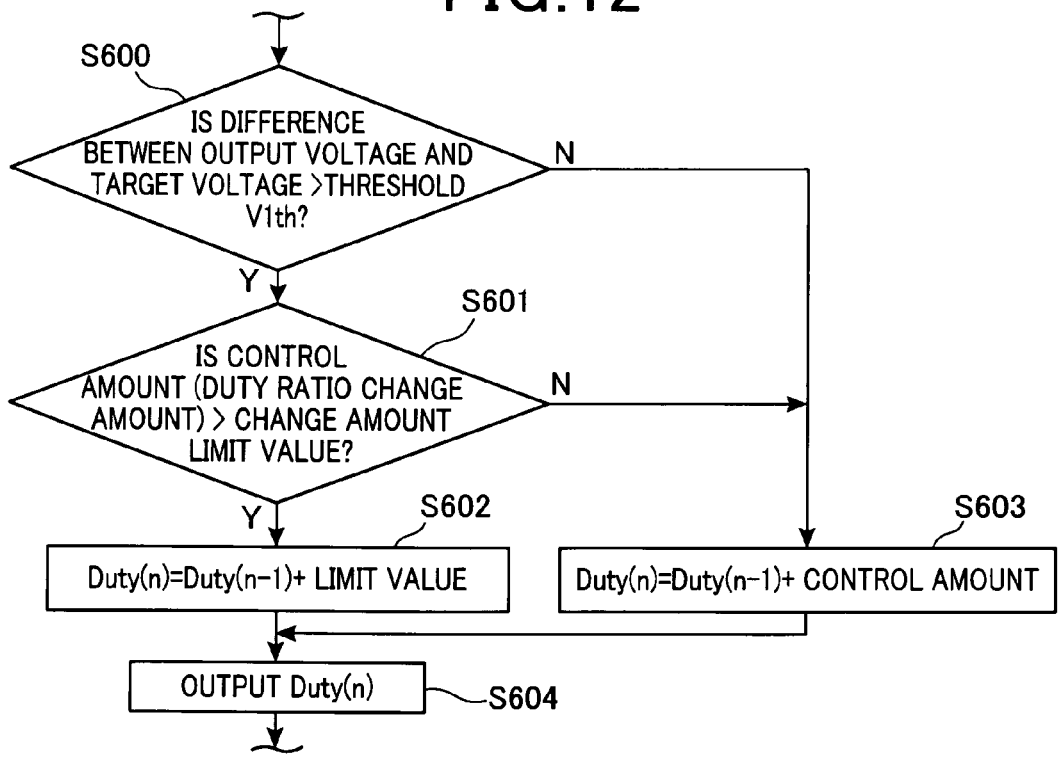
FIG. 12 is a flowchart for explaining operations of the DC-DC converter in a tenth variation example according to the first embodiment.

As shown in FIG. 12, the control circuit 16 judges whether or not the difference between the output voltage and the target voltage is higher than a threshold value V1th (S600). When judged at Step S600 that the difference between the output voltage and the target voltage is higher than the threshold value V1th, the control circuit 16 further judges whether or not the control amount (duty ratio change amount) is greater than the change amount limit value (S601). When judged at Step S601 that the control amount (duty ratio change amount) is greater than the change amount limit value, the control circuit 16 performs Step S602 and Step S604.

On the other hand, when judged at Step S600 that the difference between the output voltage and the target voltage is the threshold V1th or less, or when judged at Step S601 that the control amount (duty ratio change amount) is the change amount limit value or less, the control circuit 16 performs Step S603 and Step S604.

As a result of the time change amount of the duty ratio and the like being limited based on the difference between the output voltage and the target voltage, the threshold is set such as to allow the withstanding voltages of the secondary-side components. As a result, the withstanding voltages can be lowered while ensuring control responsiveness within a wide target voltage range.

Furthermore, according to the first embodiment, an example is given in which the duty ratio change amount limiting section 160d limits the duty ratio change amount regardless of the polarity of the duty ratio change amount outputted by the control voltage switching section 160c. However, the present invention is not limited thereto, and the following is possible.

Eleventh Variation Example According to the First Embodiment

The duty ratio change amount may be limited when the main switching element 102 is controlled such that the output voltage of the power conversion circuit 10 rises.

Figure 13:
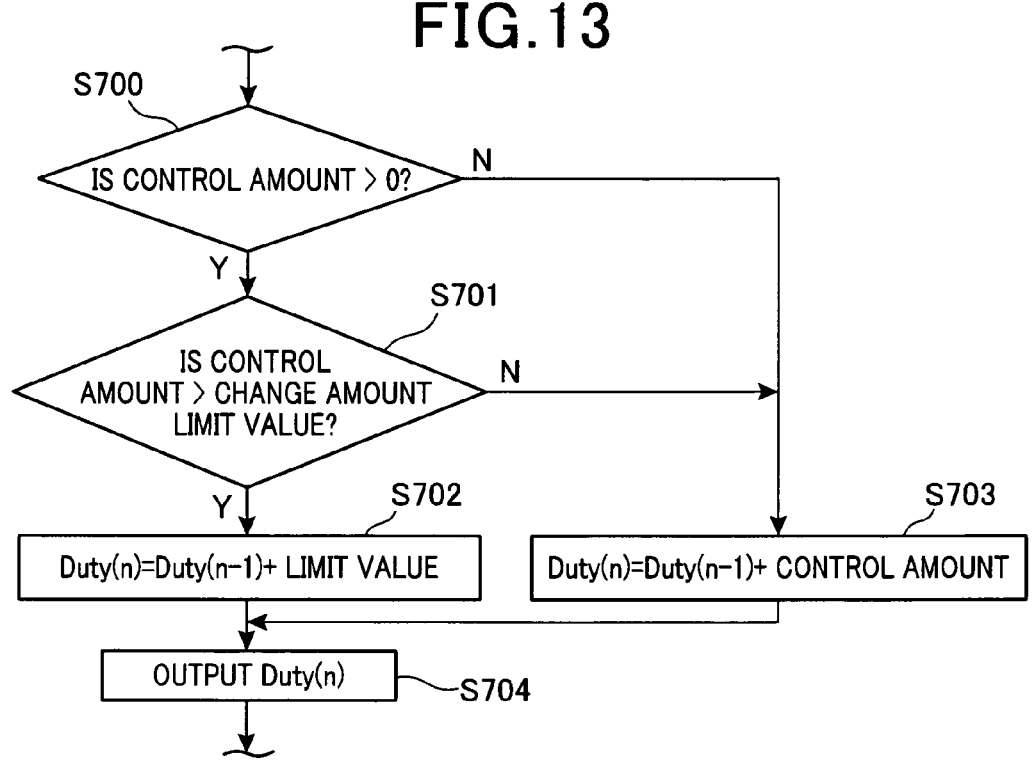
FIG. 13 is a flowchart for explaining operations of the DC-DC converter in an eleventh variation example according to the first embodiment.
Figure 14:
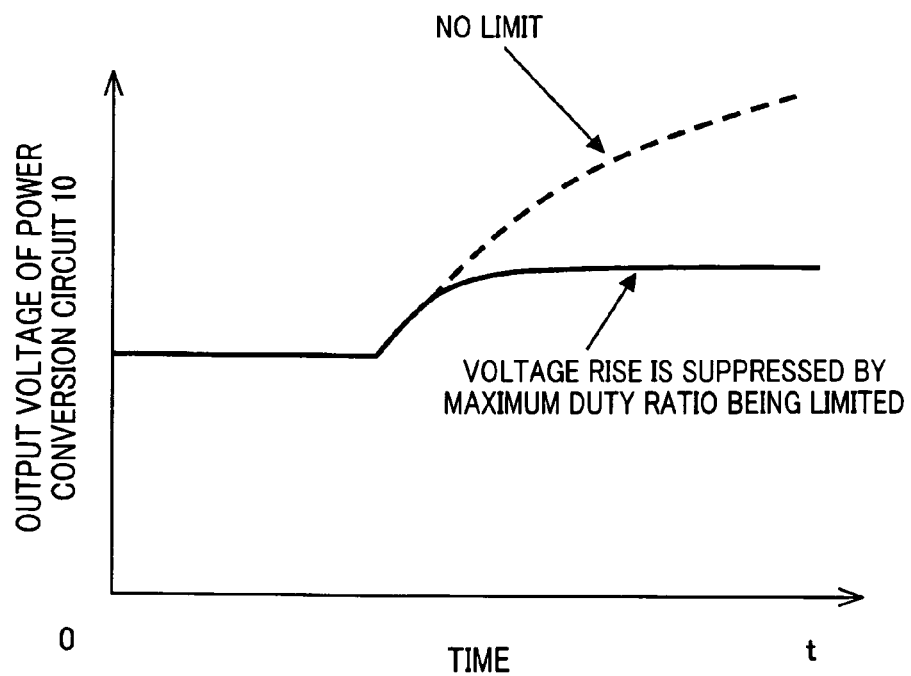
FIG. 14 is a graph of output voltage waveforms of the power conversion circuit in the eleventh variation example according to the first embodiment.

Operations will be described with reference to FIG. 13 and FIG. 14. Here, FIG. 13 is a flowchart for explaining the operations of the DC-DC converter in an eleventh variation example according to the first embodiment. FIG. 14 is a graph of output voltage waveforms of the power conversion circuit in the eleventh variation example according to the first embodiment.

As shown in FIG. 13, the control circuit 16 judges whether or not the control amount is greater than zero (S700). When judged at Step S700 that the control amount is greater than zero, the control circuit 16 further judges whether or not the control amount is greater than the change amount limit value (S701). When judged at S701 that the control amount is greater than the change amount limit value, the control circuit 16 performs Step S702 and Step S704.

On the other hand, when judged at Step S700 that the control amount is zero or less, or when judged at Step S701 that the control amount is the change amount limit value or less, the control circuit 16 performs Step S703 and Step S704.

A disconnection detecting means, such as a detection line and an output line for the output voltage, is not required. In addition, even when transient fluctuations occur, such as sudden changes in input voltage and load, the rise in output voltage of the power conversion circuit 10 can be efficiently reduced as shown in FIG. 14.

In addition, according to the first embodiment, an example is given in which the output of the duty ratio calculating section 160h is inputted into the duty ratio selecting section 160i and processed. However, the present invention is not limited thereto, and the following is possible.

Twelfth Variation Example According to the First Embodiment

Figure 15:
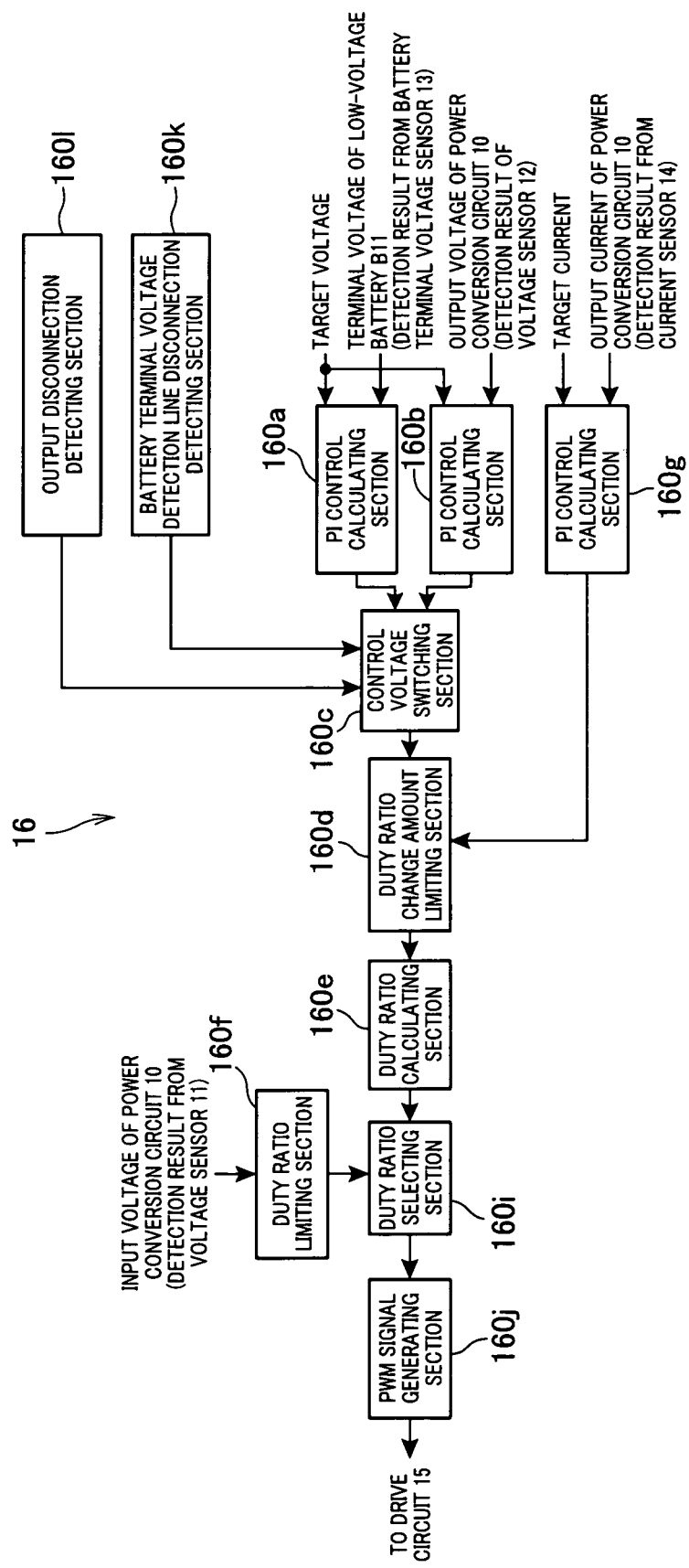
FIG. 15 is a block diagram of the control circuit in a twelfth variation example according to the first embodiment.

As shown in FIG. 15, the output of the PI control calculating section 160g may be inputted to the duty ratio change amount limiting section 160d and processed.

Second Embodiment

Next, a DC-DC converter according to a second embodiment will be described. The DC-DC converter according to the second embodiment is the DC-DC converter according to the first embodiment in which a maximum duty ratio limiting section is added to the control circuit, and both the time change amount of the duty ratio and a maximum duty ratio of the PWM signal are controlled.

Figure 16:
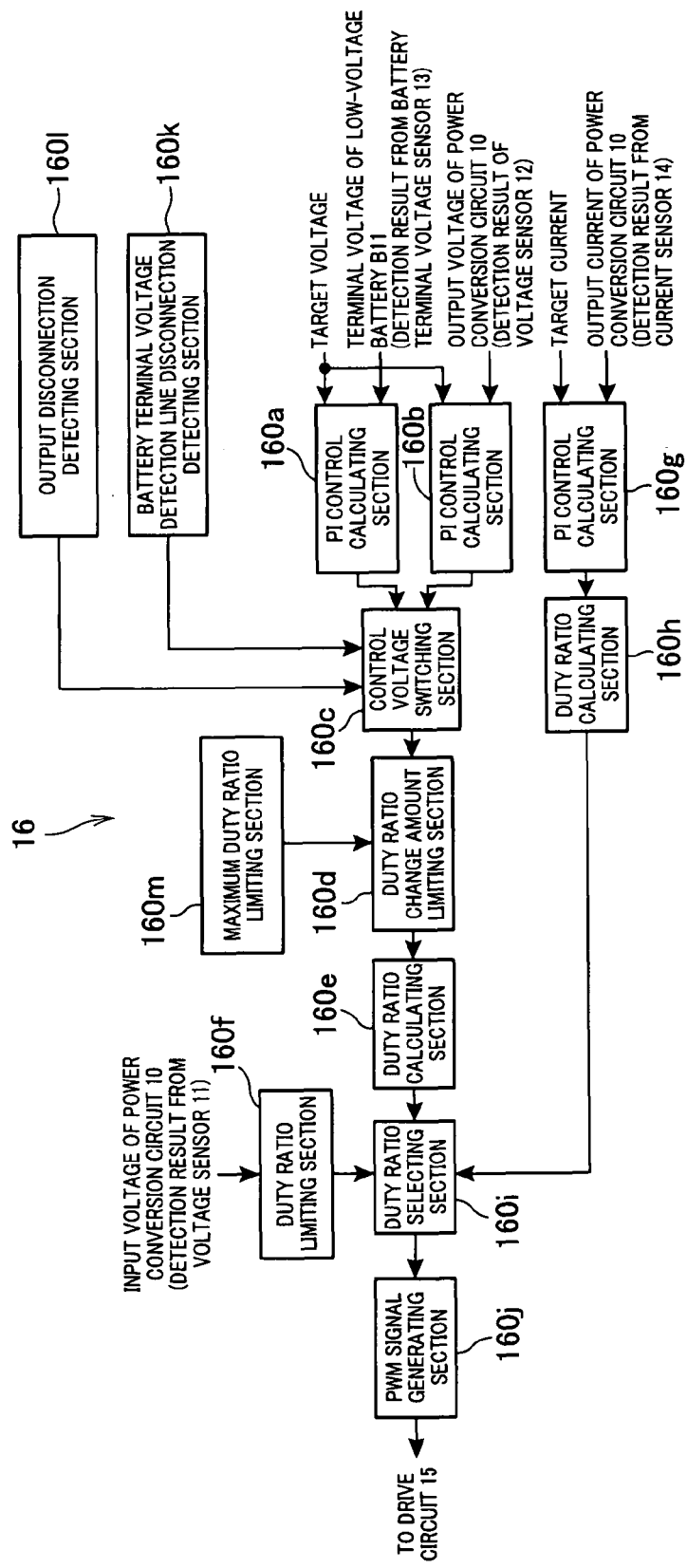
FIG. 16 is a block diagram of a control circuit of a DC-DC converter according to a second embodiment.

A configuration of the DC-DC converter will be described with reference to FIG. 16. Here, FIG. 16 is a block diagram of the control circuit of the DC-DC converter according to the second embodiment, which is functionally realized by the CPU (i.e., a computer system) incorporated in the control circuit 16. Here, the maximum duty ratio limiting section that is the section differing from the DC-DC converter according to the first embodiment will be described. Descriptions of common sections will be omitted unless required. Constituent elements that are the same as those in the DC-DC converter according to the first embodiment are given the same reference numbers.

In a manner similar to that according to the first embodiment, as shown in FIG. 16, the control circuit 16 includes the PI control calculating sections 160a and 160b, the control voltage switching section 160c, the duty ratio change amount limiting section 160d, the duty ratio calculating section 160e, the duty ratio limiting section 160f, the PI control calculating section 160g, the duty ratio calculating section 160h, the duty ratio selecting section 160i, the PWM signal generating section 160j, the battery terminal voltage detection line disconnection detecting section 160k, and the output disconnection detecting section 160l. The control circuit 16 further includes a maximum duty ratio limiting section 160m.

The maximum duty ratio limiting section 160m is a block that limits the maximum value of the duty ratio of the PWM signal. The maximum duty ratio limiting section 160m can output as the maximum duty ratio, a predetermined maximum value of the duty ratio that is set in advance and is such that the target voltage can be ensured as the output voltage, and the output voltage does not become excessively large in relation to the target voltage.

The duty ratio change amount limiting section 160d outputs the duty ratio change amount within a range in which the duty ratio of the PWM signal does not exceed the maximum duty ratio outputted by the maximum duty ratio limiting section 160m.

Operations are the same as those of the DC-DC converter according to the first embodiment, excluding the maximum duty ratio of the PWM signal being limited. Therefore, descriptions thereof are omitted.

Next, effects will be described. According to the second embodiment, as a result of both the time change amount of the duty ratio and the maximum duty ratio of the PWM signal being limited, sudden change in the output voltage of the power conversion circuit 10 can be suppressed with certainty. Therefore, the rise in output voltage of the power conversion circuit 10 can be reduced. As a result, even when a temporary transient response occurs or the response time of the transient response increases, the withstanding voltages of the constituent components of the power conversion circuit 10 can be lowered with certainty.

According to the second embodiment, when a disconnection has occurred between the power conversion circuit 10 and the low-voltage battery B11, power is supplied from the low-voltage battery B11 to a load, and the voltage of the low-voltage battery B11 drops. In accompaniment, the voltage of the output terminal of the power conversion circuit 10 rises. Therefore, control is switched to control of the voltage of the output terminal of the power conversion circuit 10. However, although the output voltage of the power conversion circuit 10 rises until the control state is switched, the voltage rise can be suppressed as a result of the time change amount of the duty ratio being limited. In addition, the maximum value of the voltage that rises can be limited as a result of the maximum duty ratio being limited. Therefore, the withstanding voltages of the constituent components of the power conversion circuit 10 can be lowered.

Furthermore, according to the second embodiment, the duty ratio change amount limiting section 160d adjusts the duty ratio of the PWM signal such as to be the limit value of the maximum duty ratio or lower, and outputs the adjusted PWM signal, based on the limit value outputted by the maximum duty ratio limiting section 160m. As a result of the transient response speed being predicted in advance and a limit value for the time change amount of the duty ratio being provided, the rise in output voltage can be suppressed. In addition, as a result of the limit value being provided for the maximum duty ratio, the maximum voltage on the secondary side can be suppressed. Therefore, the change in output voltage of the power conversion circuit 10 can be reduced with certainty.

According to the second embodiment, an example is given in which the duty ratio is limited by the limit value of the maximum duty ratio being set to a predetermined value. However, the present invention is not limited thereto, and the following is possible.

First Variation Example According to the Second Embodiment

Figure 17:
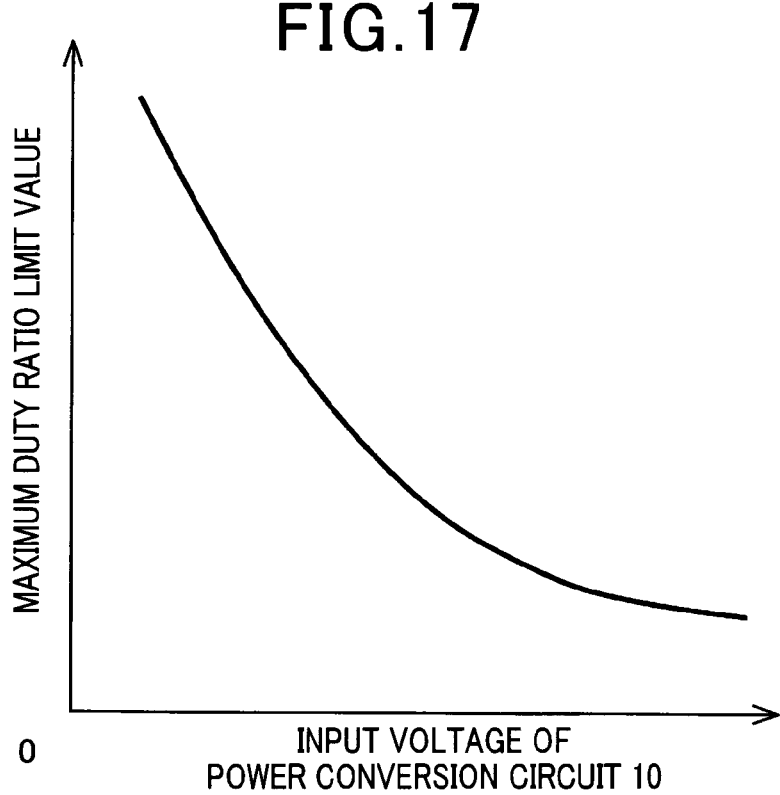
FIG. 17 is a map of maximum duty ratio limit values in relation to input voltage of the power conversion circuit in a first variation example according to the second embodiment.

As shown in FIG. 17, the limit value of the maximum duty ratio may be lowered as the input voltage of the power conversion circuit 10 rises. When the maximum duty ratio is set based on when the input voltage is high, the duty ratio for outputting the target voltage may become insufficient and the output voltage may not be ensured, when the input voltage is low. Therefore, as a result of the limit value being lowered as the input voltage rises, optimization can be performed without loss of control responsiveness, and the possibility of insufficient output voltage can be prevented. Furthermore, the rise in output voltage can be efficiently reduced.

Second Variation Example According to the Second Embodiment

Figure 18:
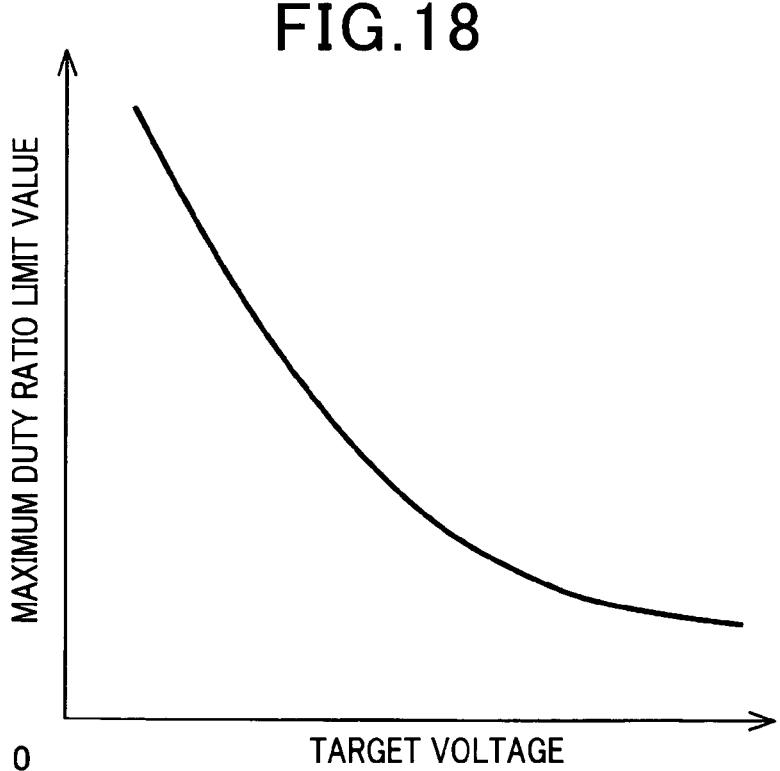
FIG. 18 is a map of the maximum duty ratio limit values in relation to target voltage in a second variation example according to the second embodiment.

As shown in FIG. 18, the limit value of the maximum duty ratio may be set depending on the target voltage. When the target voltage changes, if the target voltage at which the duty ratio during ordinary control becomes large is high based on a map, the maximum duty ratio can be set to a small value. If the target voltage at which the duty ratio during ordinary control becomes small is low, the maximum duty ratio can be set to a large value. As a result, the rise in secondary-side output voltage can be suppressed without loss of control performance when the target voltage is low.

Third Variation Example According to the Second Embodiment

Figure 19A:
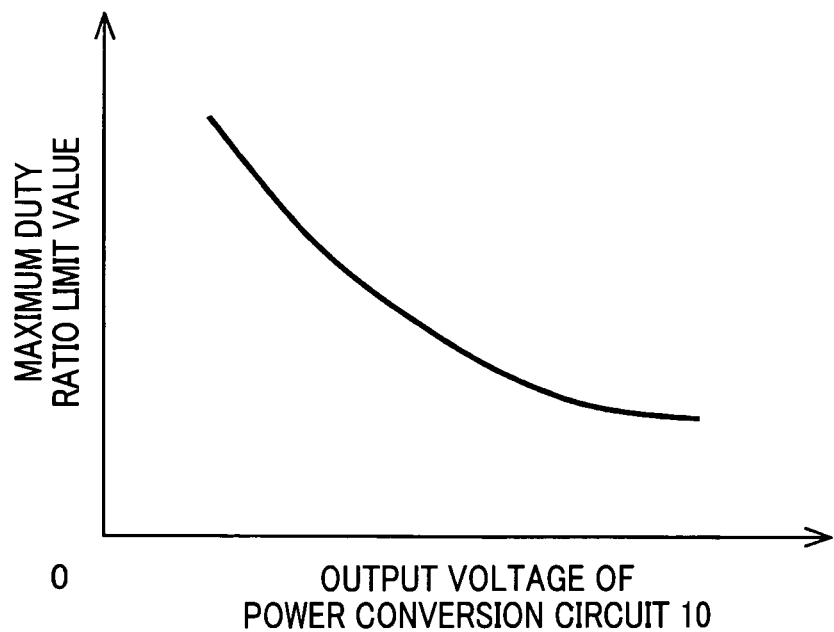
FIG. 19A and FIG. 19B are maps of maximum duty ratio limit values and duty ratio change amount limit values in relation to output voltage of the power conversion circuit in a third variation example according to the second embodiment.
Figure 19B:
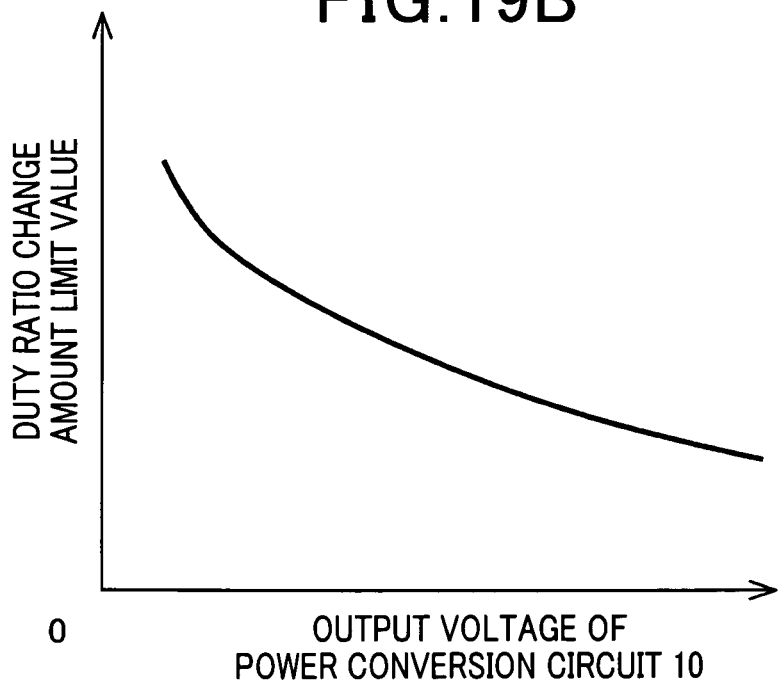

As shown in FIG. 19, the limit values of the duty ratio change amount and the maximum duty ratio may be set depending on the voltage value of the output terminal of the power conversion circuit 10. The rise in secondary-side output voltage can be suppressed without loss in control responsiveness.

According to the second embodiment, an example is given in which the maximum duty ratio is limited at all times. However, the period over which the maximum duty ratio is limited is not limited thereto. The maximum duty ratio and the duty ratio change amount may be limited based on the conditions described below.

Fourth Variation Example According to the Second Embodiment

The duty ratio change amount and the maximum duty ratio may be limited when the control state is switched in accompaniment with whether or not a disconnection has occurred between the power conversion circuit 10 and the low-voltage battery B11.

Operations will be described with reference to FIG. 20. Here, FIG. 20 is a flowchart for explaining the operations of the DC-DC converter in a fourth variation example according to the second embodiment.

Figure 20:
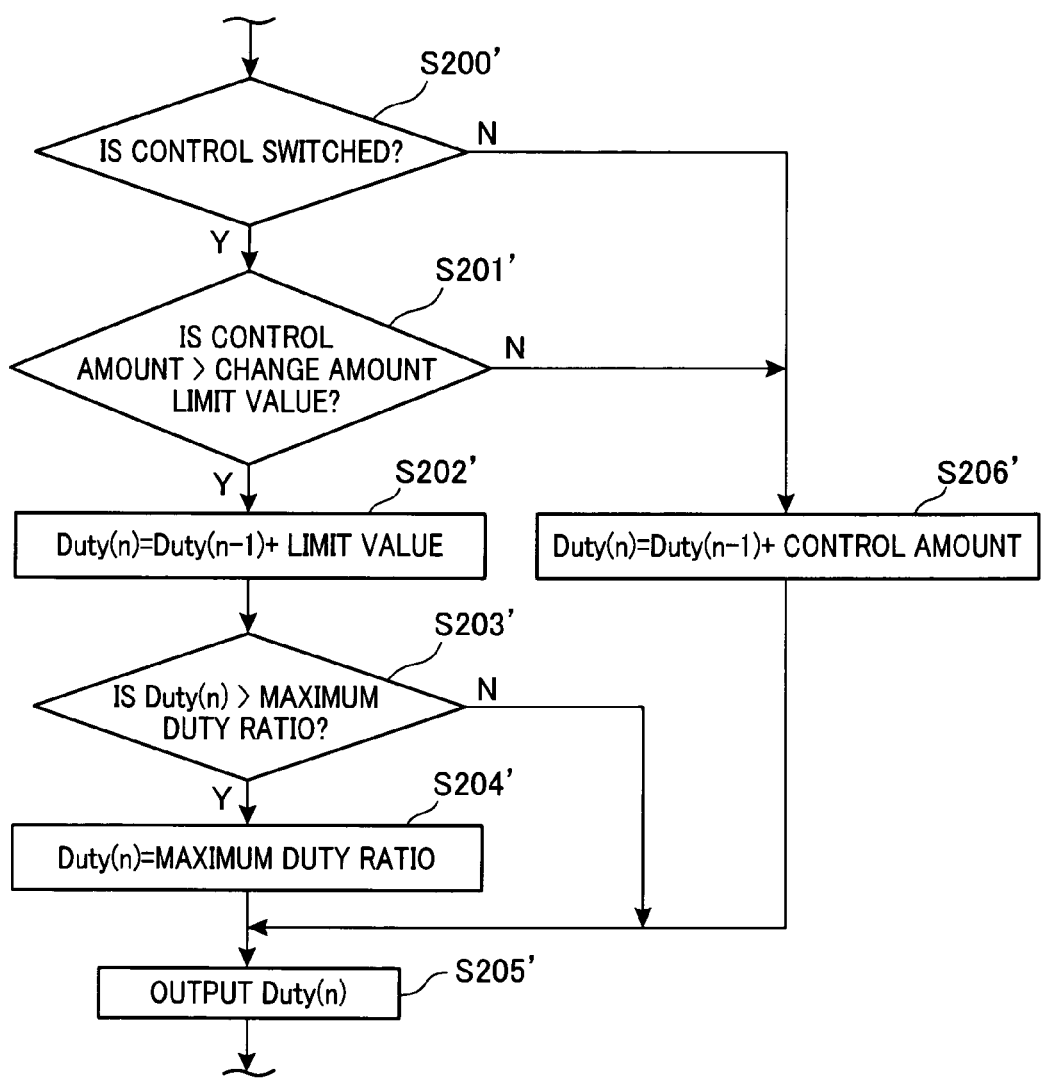
FIG. 20 is a flowchart for explaining operations of the DC-DC converter in a fourth variation example according to the second embodiment.

As shown in FIG. 20, the control circuit 16 judges whether or not the control state has been switched in accompaniment with whether or not a disconnection has occurred between the power conversion circuit 10 and the low-voltage battery B11 (S200'). When judged at Step S200' that the control state has been switched, the control circuit 16 further judges whether or not the control amount is greater than the change amount limit value (S201'). When judged at Step S201' that the control amount is greater than the change amount limit value, the control circuit 16 adds the limit value to the previous duty ratio Duty(n−1) and sets the result as the current duty ratio Duty(n) (S202'). Then, the control circuit 16 judges whether the current duty ratio Duty(n) is greater than the maximum duty ratio (S203').

When judged at Step S203' that the current duty ratio Duty(n) is greater than the maximum duty ratio, the control circuit 16 sets the maximum duty ratio as the current duty ratio Duty(n) (S204'). On the other hand, when judged at Step S203' that the current duty ratio Duty(n) is the maximum duty ratio or less, the control circuit 16 sets Duty(n) as the current duty ratio. The control circuit 16 then outputs the current duty ratio Duty (n) (S205').

On the other hand, when judged at Step S200' that the control state has not been switched or when judged at Step S201' that the control amount is the control amount limit value or less, the control circuit 16 adds the control amount to the previous duty ratio Duty(n−1) and sets the result as the current duty ratio Duty(n) (S206'). The control circuit 16 then outputs the current duty ratio Duty(n) (S205').

As a result of the time change amount of the duty ratio of the PWM signal being limited when the control state is switched, transient voltage rise can be suppressed. In addition, as a result of the maximum duty ratio being limited, voltage rise can be suppressed. Therefore, the withstanding voltages of the secondary-side constituent components of the power conversion circuit 10 can be lowered.

Fifth Variation Example According to the Second Embodiment

The duty ratio time change amount and the maximum duty ratio may be limited when a disconnection has occurred between the battery terminal voltage sensor 13 and the control circuit 16.

Operations will be described with reference to FIG. 21. Here, FIG. 21 is a flowchart for explaining the operations of the DC-DC converter in a fifth variation example according to the second embodiment.

Figure 21:
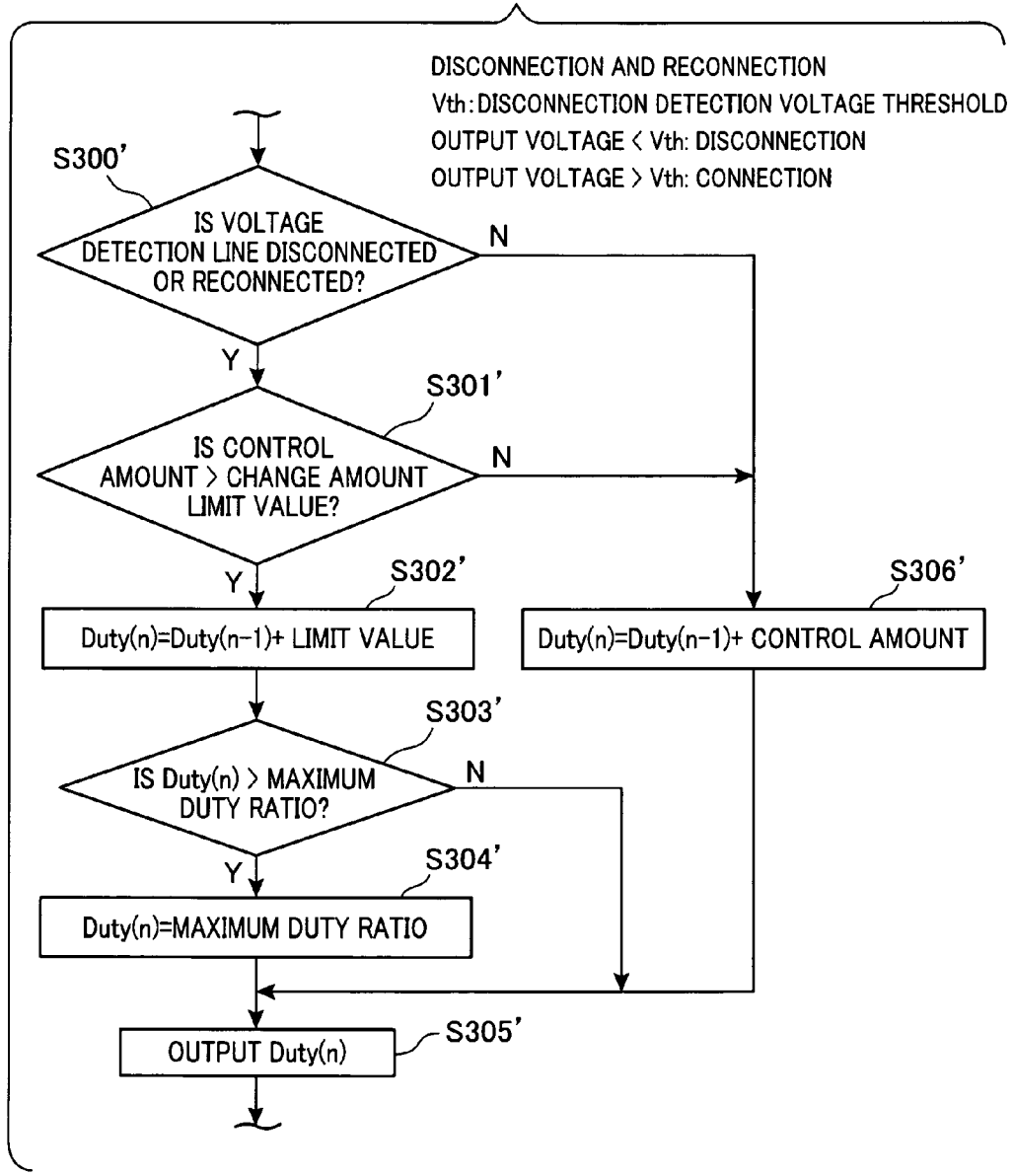
FIG. 21 is a flowchart for explaining operations of the DC-DC converter in a fifth variation example according to the second embodiment.

As shown in FIG. 21, the control circuit 16 judges whether a disconnection or a reconnection has occurred between the battery terminal voltage sensor 13 and the control circuit 16 (S300'). Specifically, the control circuit 16 judges that a disconnection has occurred when the output voltage is judged to be less than a disconnection detection voltage threshold value Vth.

The control circuit 15 judges that the battery terminal voltage sensor 13 and the control circuit 16 are connected when the output voltage is judged to be higher than the disconnection detection voltage threshold value Vth. When judged at Step S300' that a disconnection or a reconnection has occurred between the battery terminal voltage sensor 13 and the control circuit 16, the control circuit 16 further judges whether the control amount is greater than the change amount limit value (S301'). Subsequently, in a manner similar to that in the fourth example according to the second embodiment, the control circuit 16 outputs the current duty ratio Duty(n) after performing Step S302' to Step S304' (S305').

On the other hand, when judged at Step S300' that a disconnection or a reconnection has not occurred between the battery terminal voltage sensor 13 and the control circuit 16, or when judged at Step S301' that the control amount is the change amount limit value or less, in a manner similar to that in the fourth variation example, the control circuit 16 adds the control value to the previous duty ratio Duty(n−1) and sets the result as the current duty ratio Duty(n) (S306'). The control circuit 16 then outputs the current duty ratio Duty(n) (S305').

The secondary-side maximum voltage can be suppressed.

Sixth Variation Example According to the Second Embodiment

The duty ratio time change amount and the maximum duty ratio may be limited during a fixed period after a disconnection between the battery terminal voltage sensor 13 and the control circuit 16 is judged to have occurred, or a period until the control state is switched in accompaniment with a disconnection.

Operations will be described with reference to FIG. 21. In FIG. 21, Step S301' to Step S304' are performed based on the judgment result at Step S300', during the fixed period after a disconnection is judged to have occurred or the period until the control state is switched in accompaniment with the disconnection. Step S301' to Step S304 are not performed after the period has elapsed.

The transient rise in output voltage of the power conversion circuit 10 accompanying the disconnection between the battery terminal voltage sensor 13 and the control circuit 16 is suppressed. Therefore, as a result of the control state being switched during the period in which the transient rise in output voltage is suppressed, the withstanding voltages of the components on the secondary side can be suppressed.

Seventh Variation Example According to the Second Embodiment

The duty ratio time change amount and the maximum duty ratio may be limited when the time change amount of the output voltage of the power conversion circuit 10 exceeds a threshold value.

Figure 22A:
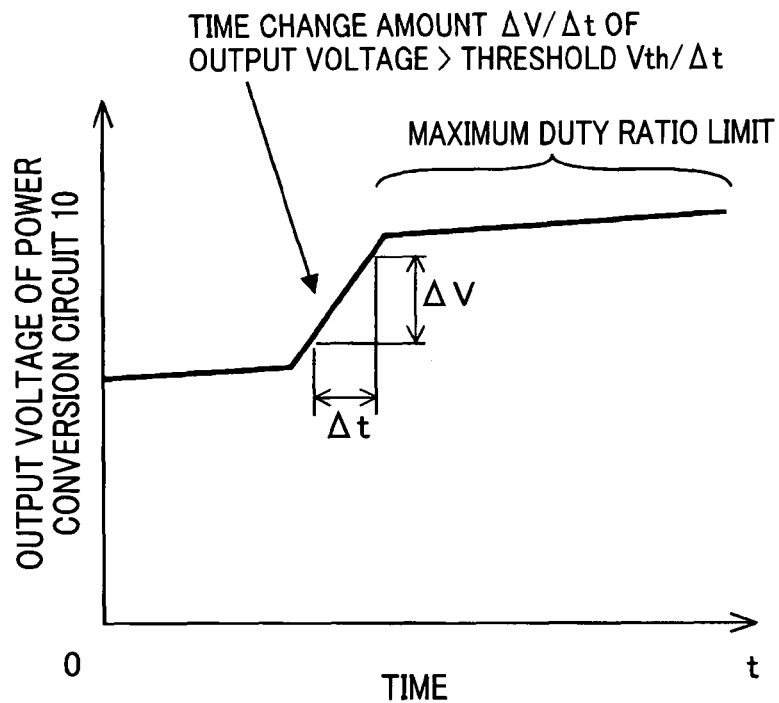
FIG. 22A and FIG. 22B are graphs of an output voltage waveform of the power conversion circuit and a duty ratio fluctuation range in relation to output voltage, when maximum duty ratio is limited in a seventh variation example according to the second embodiment.
Figure 22B:
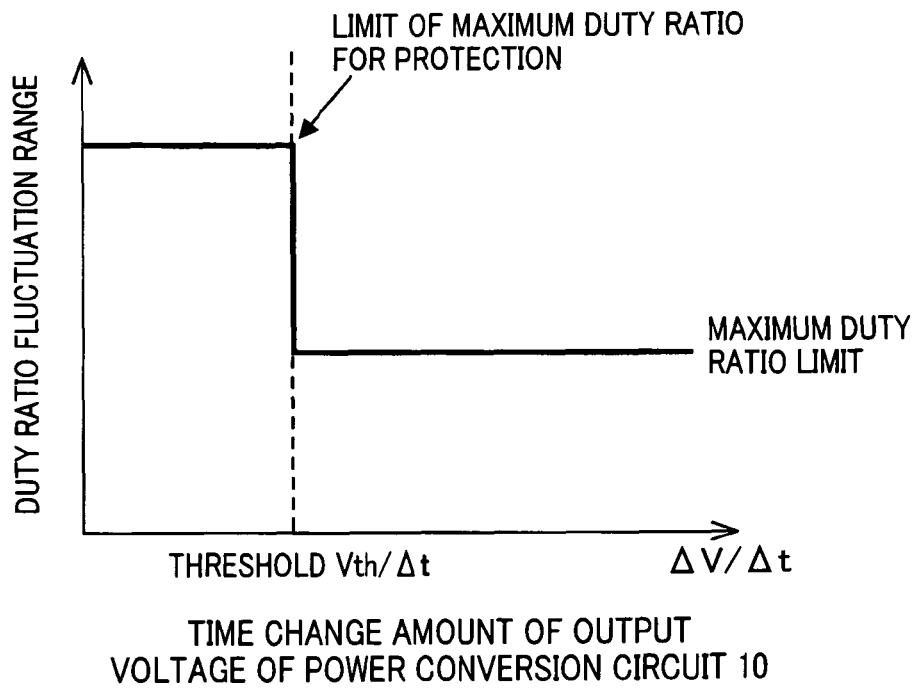

Operations will be described with reference to FIG. 9 used in the description of the seventh variation example according to the first embodiment, and FIG. 22A and FIG. 22B. Here, FIG. 22A and FIG. 22B are graphs of an output voltage waveform and a duty ratio fluctuation range in relation to the output voltage of the power conversion circuit when the maximum duty ratio is limited in the seventh variation example according to the second embodiment.

When a time change amount ΔV/Δt of the output voltage exceeds a threshold ΔVth/Δt as shown in FIG. 9A, the control circuit 16 limits the duty ratio time change amount as shown in FIG. 9B. As a result, the rise in output voltage is reduced as shown in FIG. 9A. In addition, when the time change amount ΔV/Δt of the output voltage exceeds the threshold ΔVth/Δt as shown in FIG. 22A, the control circuit 16 limits the maximum duty ratio as shown in FIG. 22B. As a result, the rise in output voltage is reduced as shown in FIG. 22A.

Transient rise in output voltage of the power conversion circuit 10 can be judged with certainty without a separate detecting means for disconnections and the like being provided. Therefore, the rise in output voltage of the power conversion circuit 10 can be efficiently reduced.

Eighth Variation Example According to the Second Embodiment

The duty ratio time change amount and the maximum duty ratio may be limited when the output voltage is the target voltage or higher, and the control amount is increased.

Figure 23:
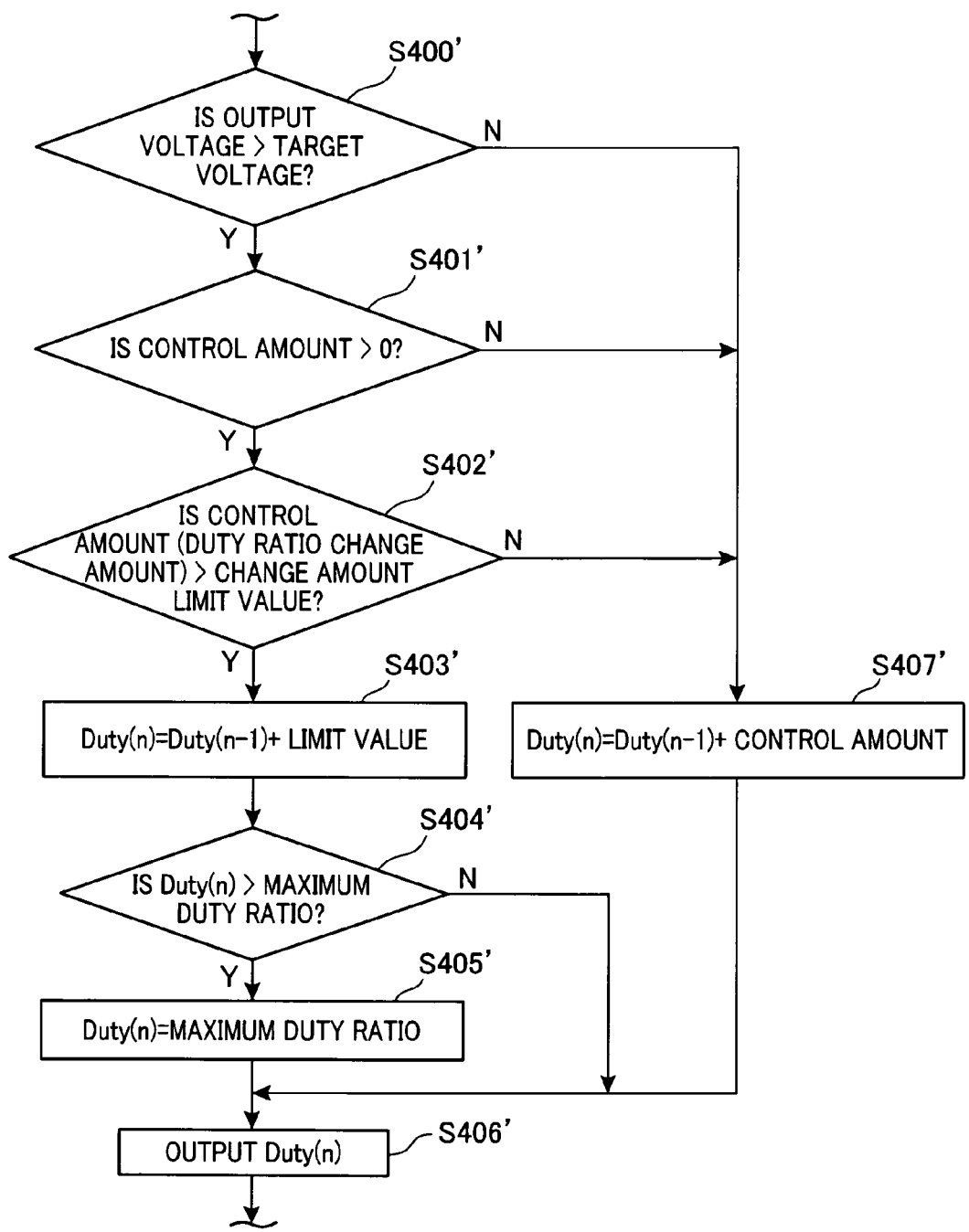
FIG. 23 is a flowchart for explaining operations of the DC-DC converter in an eighth variation example according to the second embodiment.

Operations will be described with reference to FIG. 23. FIG. 23 is a flowchart for explaining the operations of the DC-DC converter in an eighth example according to the second embodiment.

As shown in FIG. 23, the control circuit 16 judges whether or not the output voltage of the power conversion circuit 10 is higher than the target voltage (S400'). When judged at Step S400' that the output voltage is higher than the target voltage, the control circuit 16 further judges whether or not the control amount is greater than zero (S401'). When judged at Step S401' that the control amount is greater than zero, the control circuit 16 further judges whether or not the control amount (duty ratio change amount) is greater than the change amount limit value (S402').

When judged at Step S402' that the control amount (duty ratio change amount) is greater than the change amount limit value, the control circuit 16 adds the limit value to the previous duty ratio Duty(n−1) and sets the result as the current duty ratio Duty(n) (S403'). The control circuit 19 then judges whether or not the current duty ratio Duty(n) is greater than the maximum duty ratio (S404').

When judged at Step S404' that the current duty ratio Duty(n) is greater than the maximum duty ratio, the control circuit 16 sets the maximum duty ratio as the current duty ratio Duty(n) (Step S405'). On the other hand, when judged at Step S404' that the current duty ratio Duty(n) is the maximum duty ratio or less, the control circuit 16 sets Duty(n) as the current duty ratio. The control circuit 16 then outputs the current duty ratio Duty(n) (S406').

On the other hand, when judged at Step S400' that the output voltage is the target voltage or less, when judged at Step S401' that the control amount is zero or less, or when judged at Step S402' that the control amount (duty ratio change amount) is the change amount limit value or less, the control circuit 16 adds the control amount to the previous duty ratio Duty(n−1) and sets the result as the current duty ratio Duty(n) (S407'). The control circuit 16 then outputs the current duty ratio Duty(n) (S406').

When the output voltage is less than the target voltage, the rise in output voltage can be suppressed while ensuring required output responsiveness.

Ninth Variation Example According to the Second Embodiment

The duty ratio time change amount and the maximum duty ratio may be limited when the target voltage is a threshold value or more.

Operations will be described with reference to FIG. 24. Here, FIG. 24 is a flowchart for explaining the operations of the DC-DC converter in a ninth variation example according to the second embodiment.

Figure 24:
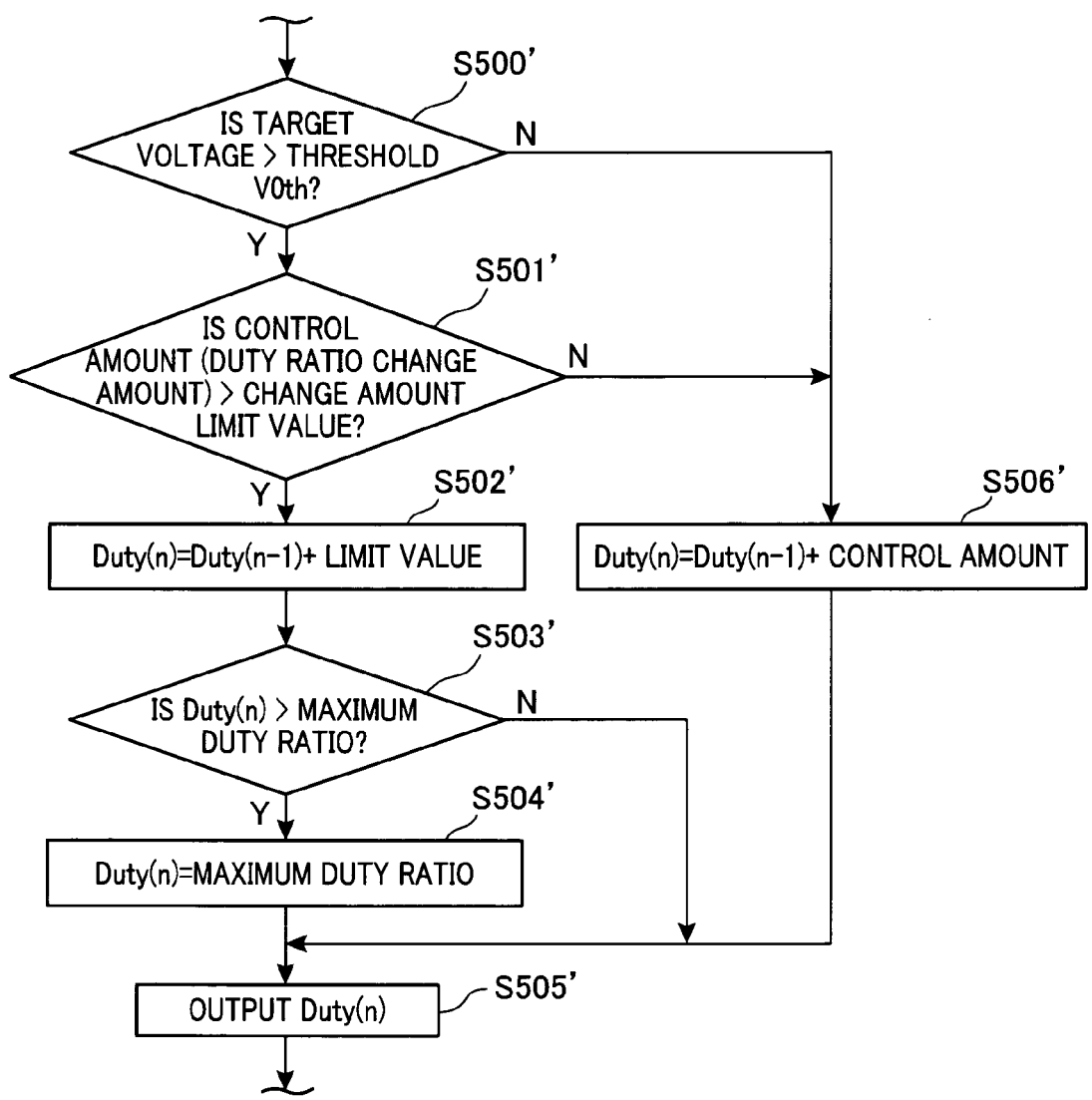
FIG. 24 is a flowchart for explaining operations of the DC-DC converter in a ninth variation example according to the second embodiment.

As shown in FIG. 24, the control circuit 16 judges whether or not the target voltage is higher than a threshold value V0th (S500'). When judged at Step S500' that the target voltage is higher than the threshold V0th, the control circuit 16 further judges whether or not the control amount (duty ratio change amount) is greater than the change amount limit value (S501'). When judged at Step S501' that the control amount (duty ratio change amount) is greater than the change amount limit value, the control circuit 16 adds the limit value to the previous duty ratio Duty(n−1) and sets the result as the current duty ratio Duty(n) (S502'). The control circuit 16 then judges whether or not the current duty ratio Duty(n) is greater than the maximum duty ratio (S503').

When judged at Step S503' that the current duty ratio Duty(n) is greater than the maximum duty ratio, the control circuit 16 sets the maximum duty ratio as the current duty ratio Duty(n) (Step S504'). On the other hand, when judged at Step S503' that the current duty ratio Duty(n) is the maximum duty ratio or less, the control circuit 16 sets Duty(n) as the current duty ratio. The control circuit 16 then outputs the current duty ratio Duty(n) (S505').

On the other hand, when judged at S500' that the target voltage is the threshold value V0th or less or when judged at Step S501' that the control amount (duty ratio change amount) is the change amount limit value or less, the control circuit 16 adds the control amount to the previous duty ratio Duty(n−1) and sets the result as the current duty ratio Duty(n) (S506'). The control circuit 16 then outputs the current duty ratio Duty(n) (S505').

When the target voltage is set to a low voltage when the target output voltage range is wide, the limit values of the time change amount of the duty ratio and the like are eliminated and control responsiveness is ensured. When the target voltage having no allowance regarding the rise in output voltage is set to a high voltage, the time change amount of the duty ratio and the like are limited. As a result, the withstanding voltages of the secondary-side components of the power conversion circuit 10 can be lowered, while ensuring control responsiveness.

Tenth Variation Example According to the Second Embodiment

The duty ratio time change amount and the maximum duty ratio may be limited when the difference between the output voltage and the target voltage is a threshold value or more.

Operations will be described with reference to FIG. 25. Here, FIG. 25 is a flowchart for explaining the operations of the DC-DC converter in a tenth variation example according to the second embodiment.

Figure 25:
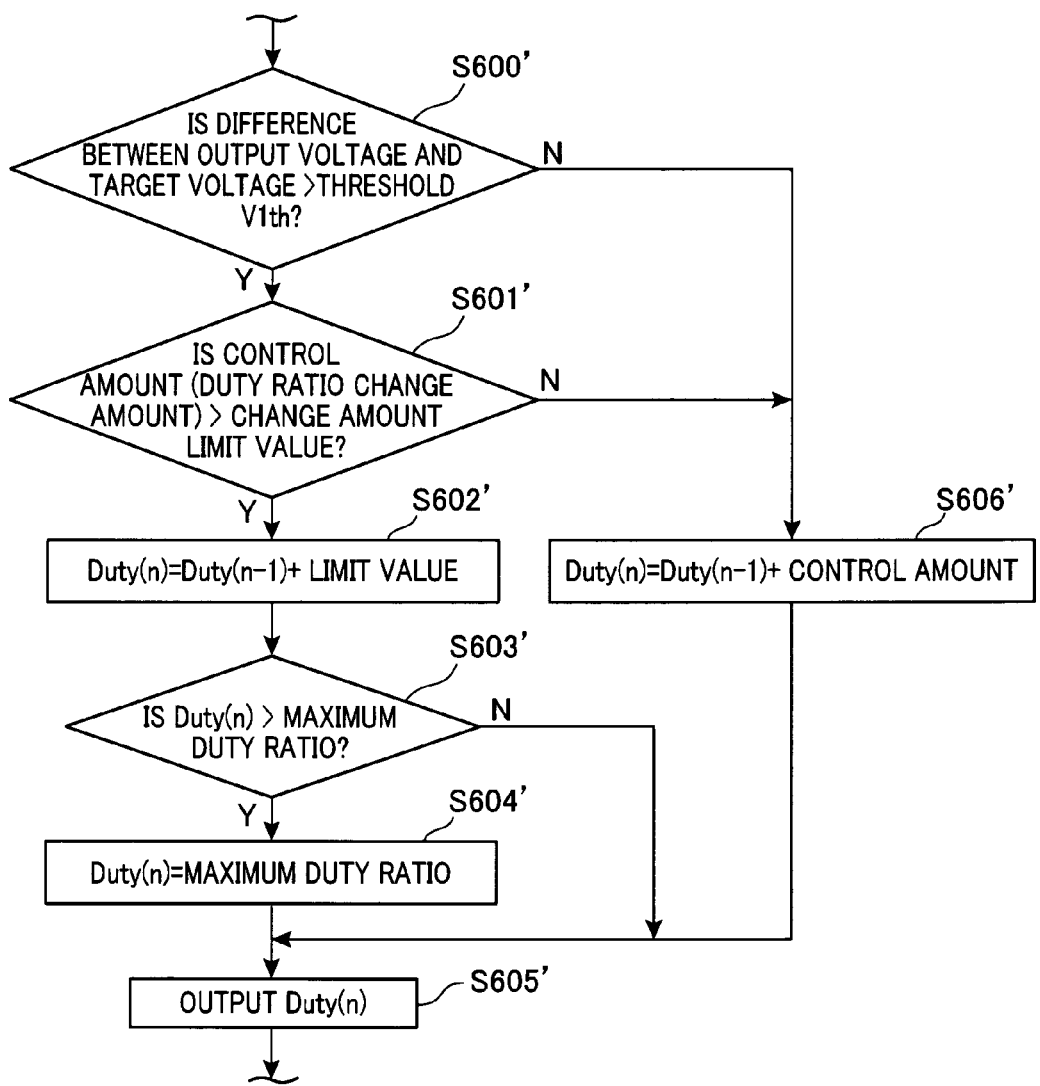
FIG. 25 is a flowchart for explaining operations of the DC-DC converter in a tenth variation example according to the second embodiment.

As shown in FIG. 25, the control circuit 16 judges whether or not the difference between the output voltage and the target voltage is higher than a threshold value V1th (S600'). When judged at Step S600' that the difference between the output voltage and the target voltage is higher than the threshold value V1th, the control circuit 16 further judges whether or not the control amount (duty ratio change amount) is greater than the change amount limit value (S601'). When judged at Step S601' that the control amount (duty ratio change amount) is greater than the change amount limit value, the control circuit 16 performs Step S602' to Step S605'.

On the other hand, when judged at Step S600' that the difference between the output voltage and the target voltage is the threshold V1th or less or when judged at Step S601' that the control amount (duty ratio change amount) is the change amount limit value or less, the control circuit 16 performs Step S606' and Step S605'.

As a result of the threshold being set such as to allow the withstanding voltages of the secondary-side components, the withstanding voltages can be lowered while ensuring control responsiveness within a wide target voltage range.

Furthermore, according to the second embodiment, an example is given in which the maximum duty ratio is limited at all times. However, the present invention is not limited thereto, and the following is possible.

Eleventh Variation Example According to the Second Embodiment

The duty ratio change amount and the maximum duty ratio may be limited when the main switching element 102 is controlled such that the output voltage of the power conversion circuit 10 rises.

Figure 26:
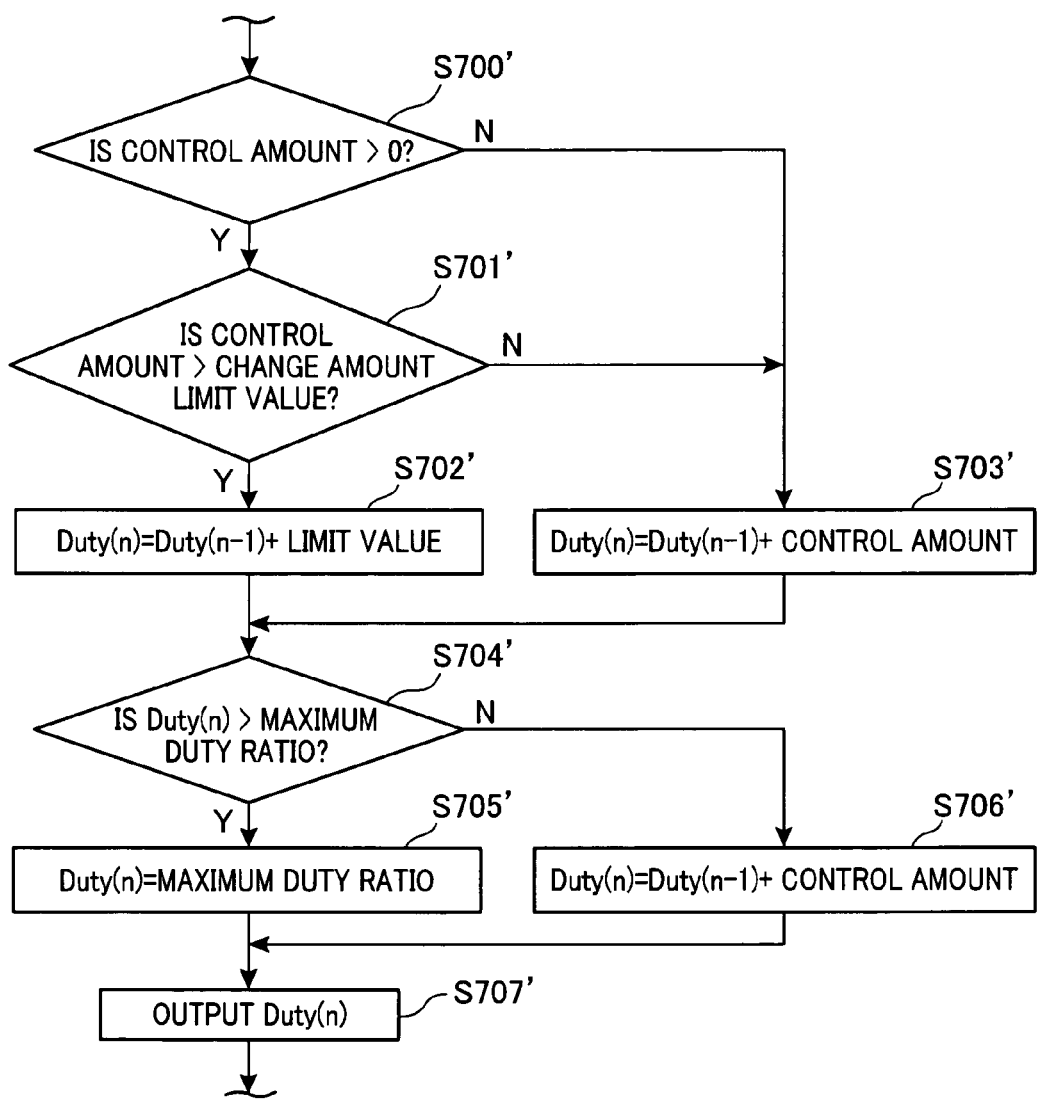
FIG. 26 is a flowchart for explaining operations of the DC-DC converter in an eleventh variation example according to the second embodiment.
Figure 27:
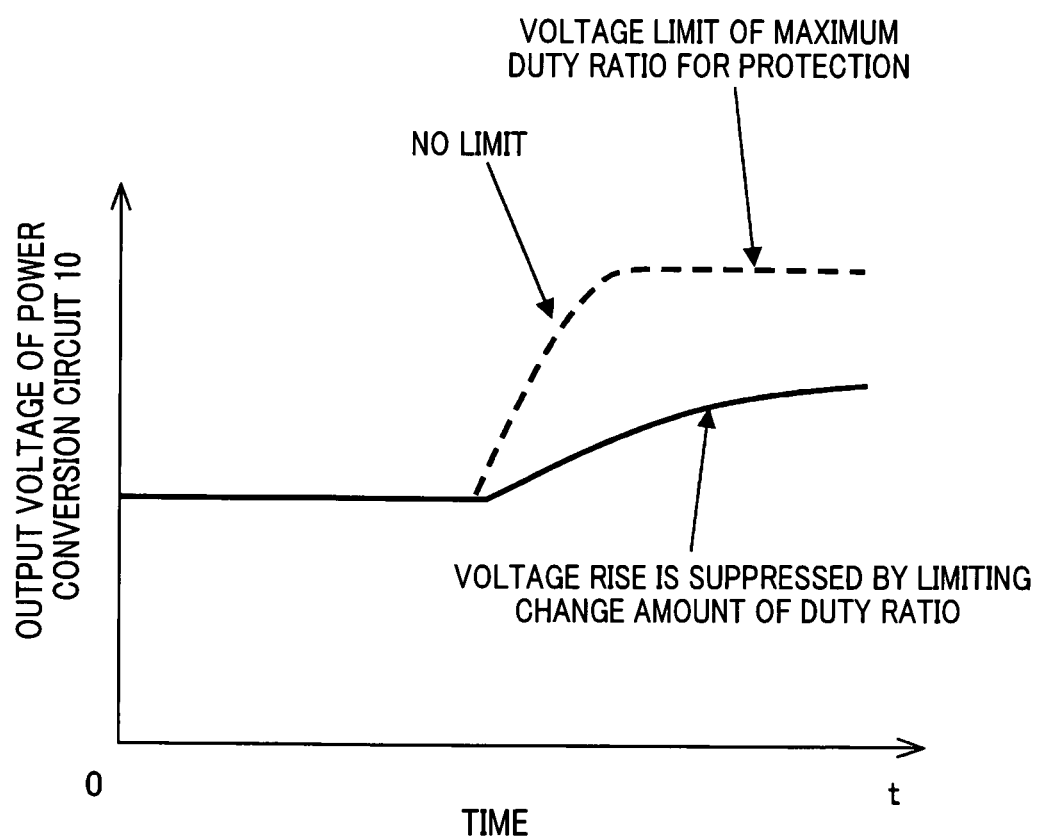
FIG. 27 is a graph of output voltage waveforms of the power conversion circuit in the eleventh variation example according to the second embodiment.

Operations will be described with reference to FIG. 26 and FIG. 27. Here, FIG. 26 is a flowchart for explaining the operations of the DC-DC converter in an eleventh variation example according to the second embodiment. FIG. 27 is a graph of output voltage waveforms of the power conversion circuit in the eleventh variation example according to the second embodiment.

As shown in FIG. 26, the control circuit 16 judges whether or not the control amount is greater than zero (S700'). When judged at Step S700' that the control amount is greater than zero, the control circuit 16 further judges whether or not the control amount is greater than the change amount limit value (S701'). When judged at Step S701' that the control amount is greater than the change amount limit value, the control circuit 16 adds the limit value to the previous duty ratio Duty(n−1) and sets the result as the current duty ratio Duty(n) (S702'). On the other hand, when judged at Step S700' that the control amount is zero or less or when judged at Step S701' that the control amount is the change amount limit value or less, the control circuit 16 adds the control amount to the previous duty ratio Duty(n−1) and sets the result as the current duty ratio Duty(n) (S703').

The control circuit 16 then judges whether the current duty ratio Duty(n) is greater than the maximum duty ratio limit value (Step S704'). When judged at Step S704' that the current duty ratio Duty(n) is greater than the maximum duty ratio limit value, the control circuit 16 sets the maximum duty ratio limit value as the current duty ratio Duty(n) (S705'). On the other hand, when judged at Step S704' that the current duty ratio Duty(n) is the maximum duty ratio limit value or less, the control circuit 16 adds the control amount to the previous duty ratio Duty(n−1) and sets the result as the current duty ratio Duty(n) (S706'). The control circuit 16 then outputs the current duty ratio Duty(n) (S707').

The battery terminal voltage detection line disconnection detecting section 160k and the output disconnection detecting section 160l are no longer required. In addition, even regarding transient fluctuations, such as sudden changes in input voltage and load, the rise in output voltage of the power conversion circuit 10 can be efficiently reduced as shown in FIG. 27.

In addition, according to the second embodiment, an example is given in which the output of the duty ratio calculating section 160h is inputted to the duty ratio selecting section 160i and processed, and the output of the maximum duty ratio limiting section 160m is inputted to the duty ratio change amount limiting section 160d. However, the present invention is not limited thereto, and the following is possible.

Twelfth Variation Example According to the Second Embodiment

Figure 28:
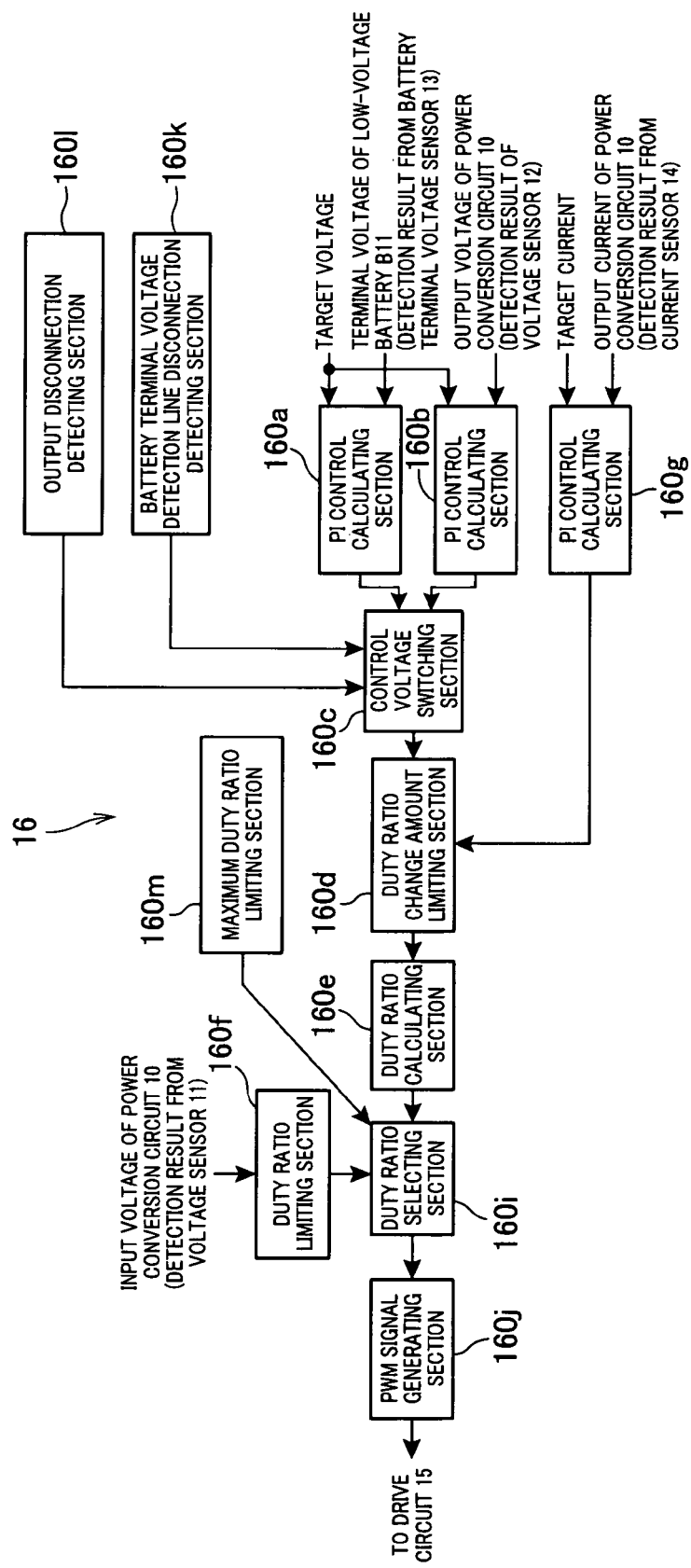
FIG. 28 is a block diagram of the control circuit in the twelfth variation example according to the second embodiment.

As shown in FIG. 28, the output of the PI control calculating section 160g can be inputted into the duty ratio change amount limiting section 160d and processed, and the output of the maximum duty ratio limiting section 160m can be inputted into the duty ratio selecting section 160i and processed.

According to the first embodiment, examples are given in which only the time amount change of the duty ratio is limited. According to the second embodiment, examples are given in which both the time amount change of the duty ratio and the maximum duty ratio are limited. However, the present invention is not limited thereto. At least either of the time change amount of the duty ratio and the maximum duty ratio may be limited.

The present invention is not limited to the embodiment described above but may variably modified as far as the modifications fall within the spirit of the present invention.

What is claimed is:

1. A power converter, comprising:
    a power converting unit including an electrical switching element electrically switched on and off selectively in response to a duty ratio of PWM (pulse-width modulation) signal given to the switching element; and
    a controller comprising
       i) a drive unit that generates the PWM signal,
       ii) a controlling unit that controls the duty ratio of the PWM signal such that a voltage inputted to the power converter is converted to a voltage to be outputted depending on the duty ratio, and
       iii) a limiting unit that limits both a time change amount of the duty ratio of the PWM signal and a maximum duty ratio of the PWM signal.

2. A power converter, comprising:
    a power converting unit including an electrical switching element electrically switched on and off selectively in response to a duty ratio of PWM (pulse-width modulation) signal given to the switching element, and an output terminal electrically connected to a battery
    a controller which is comprised of
       i) a drive unit that generates the PWM signal,
       ii) a controlling unit that controls the duty ratio of the PWM signal such that a voltage inputted to the power converter is converted to a voltage to be outputted depending on the duty ratio, and
       iii) a limiting unit that limits at least one of a time change amount of the duty ratio of the PWM signal or a maximum duty ratio of the PWM signal; and
    the controller comprises a disconnection detector that detects an electrical disconnection between the power converting unit and the battery; and
    wherein the controlling unit controls the PWM signal such that, when the disconnection is not detected by the disconnection detector, the battery has a terminal voltage equal to a target voltage and, when the disconnection is detected by the disconnection detector, the output terminal of the power converting unit has a voltage equal to a target voltage.

3. The power converter of claim 2, wherein
    the limiting unit is configured to limit at least one of the time change amount of the duty ratio and the maximum duty ratio in response to a result detected by the disconnection detector, the result showing whether the disconnection has occurred.

4. The power converter of claim 2, further comprising a voltage detector that detects a terminal voltage of the battery to supply a detected terminal voltage to the controller, the voltage detector being electrically connected to the terminal of the battery and the controller for detection of the terminal voltage,
wherein the limiting unit is configured to limit at least one of the time change amount of the duty ratio and the maximum duty ratio when the disconnection detector detects the disconnection or an electrical connection is restored between the power converting unit after the disconnection.

5. The power converter of claim 4, wherein the disconnection detector is configured to determine that there occurs the disconnection when the detected terminal voltage of the battery is lower than a threshold, and
the limiting unit is configured to limit at least one of the time change amount of the duty ratio and the maximum duty ratio for either a predetermined period of time starting from the determination of the disconnection or a period of time until which the controller starts a control state adapted to the detected disconnection.

6. The power converter of claim 2, further comprising a detector that detects a time change amount of the voltage at the output terminal of the power converting unit and determining means that determines whether or not the time change amount of the voltage at the output terminal of the power converting unit is higher than a threshold,
wherein the limiting unit limit at least one of the time change amount of the duty ratio and the maximum duty ratio when the determining means determines that the time change amount of the voltage at the output terminal of the power converting unit is higher than the predetermined threshold.

7. The power converter of claim 2, wherein, when the voltage at the output terminal of the power converter circuit is higher than the target voltage and the time change amount of the duty ratio increases, the limiting unit is configured to limit at least one of the time change amount of the duty ratio and the maximum duty ratio.

8. The power converter of claim 2, wherein, when the voltage at the output terminal of the power converter circuit is higher than the target voltage, the limiting unit is configured to limit at least one of the time change amount of the duty ratio and the maximum duty ratio.

9. The power converter of claim 2, wherein, when the voltage at the output terminal of the power converter circuit has a difference from the target voltage and the difference is equal to or higher than a threshold, the limiting unit is configured to limit at least one of the time change amount of the duty ratio and the maximum duty ratio.

10. The power converter of claim 2, wherein the controlling unit sets at least one of the time change amount of the duty ratio of the PWM signal or the maximum duty ratio of the PWM signal depending on the voltage at the output terminal of the power converting unit.

11. The power converter of claim 2, wherein the power converter is mounted in a vehicle.

12. A power converter, comprising:
a power converting unit including an electrical switching element electrically switched on and off selectively in response to a duty ratio of PWM (pulse-width modulation) signal given to the switching element; and
a controller which is comprised of
i) a drive unit that generates the PWM signal,
ii) a controlling unit that controls the duty ratio of the PWM signal such that a voltage inputted to the power converter is converted to a voltage to be outputted depending on the duty ratio, and
iii) a limiting unit that adjusts the duty ratio of the PWM signal such that a time change amount of the duty ratio of the PWM signal is limited below a limit assigned thereto, wherein the limit for the time change amount of the duty ratio of the PWM signal is set to become smaller with a rise in the input voltage to the power converting unit.

13. The power converter of claim 12, wherein the limiting unit adjusts the duty ratio of the PWM signal such that the maximum duty ratio of the PWM signal is limited below a limit assigned thereto.

14. A power converter, comprising:
a power converting unit including an electrical switching element electrically switched on and off selectively in response to a duty ratio of PWM (pulse-width modulation) signal given to the switching element; and
a controller which is comprised of
i) a drive unit that generates the PWM signal,
ii) a controlling unit that controls the duty ratio of the PWM signal such that a voltage inputted to the power converter is converted to a voltage to be outputted depending on the duty ratio, and
iii) a limiting unit configured to limit at least a time change amount of the duty ratio of the PWM signal when the controlling unit controls the switching element such that the output voltage rises.

15. The power converter of claim 14, wherein limiting unit is further configured to limit the maximum duty ratio of the PWM signal when the controlling unit controls the switching element such that the output voltage rises.

16. A power converter, comprising:
a power converting unit including an electrical switching element electrically switched on and off selectively in response to a duty ratio of PWM (pulse-width modulation) signal given to the switching element; and
a controller which is comprised of
i) a drive unit that generates the PWM signal,
ii) a controlling unit that controls the duty ratio of the PWM signal such that a voltage inputted to the power converter is converted to a voltage to be outputted depending on the duty ratio, and
iii) a limiting unit that limits a time change amount of the duty ratio of the PWM signal;
wherein the controlling unit uses a feedback gain to produce the PWM signal such that the feedback gain is reduced to allow the limiting unit to limit the time change amount of the duty ratio of the PWM signal.

17. The power converter of claim 16, wherein the limiting unit also limits a maximum duty ratio of the PWM signal.

18. A power converter, comprising:
a power converting unit including an electrical switching element electrically switched on and off selectively in response to a duty ratio of PWM (pulse-width modulation) signal given to the switching element; and
a controller which is comprised of
i) a drive unit that generates the PWM signal,
ii) a controlling unit that controls the duty ratio of the PWM signal such that a voltage inputted to the power converter is converted to a voltage to be outputted depending on the duty ratio, and
iii) a limiting unit that limits a time change amount of the duty ratio of the PWM signal;

wherein the controlling unit sets the maximum duty ratio of the PWM signal depending on a target voltage.

19. The power converter of claim 18, wherein the limiting unit also limits a maximum duty ratio of the PWM signal.

20. A power converter comprising:
a power converting means including an electrical switching element electrically switched on and off selectively in response to a duty ratio of PWM (pulse-width modulation) signal given to the switching element;
a drive means that generates the PWM signal,
control means for controlling the duty ratio of the PWM signal such that a voltage inputted to the power converter is converted to a voltage to be outputted depending on the duty ratio, and
a limiting means for limiting both a time change amount of the duty ratio of the PWM signal and a maximum duty ratio of the PWM signal.

* * * * *